(12) United States Patent
Bowers et al.

(10) Patent No.: US 10,169,821 B2
(45) Date of Patent: Jan. 1, 2019

(54) SYSTEMS AND METHODS FOR INSURANCE BASED UPON STATUS OF VEHICLE SOFTWARE

(71) Applicant: Elwha, LLC, Bellevue, WA (US)

(72) Inventors: Jeffrey A. Bowers, Bellevue, WA (US); Peter L. Hagelstein, Carlisle, MA (US); Roderick A. Hyde, Redmond, WA (US); Muriel Y. Ishikawa, Livermore, CA (US); Jordin T. Kare, Seattle, WA (US); Clarence T. Tegreene, Mercer Island, WA (US); Lowell L. Wood, Jr., Bellevue, WA (US); Victoria Y. H. Wood, Livermore, CA (US)

(73) Assignee: Elwha LLC, Bellevue, WA (US)

( * ) Notice: Subject to any disclaimer, the term of this patent is extended or adjusted under 35 U.S.C. 154(b) by 450 days.

(21) Appl. No.: 14/033,053

(22) Filed: Sep. 20, 2013

(65) Prior Publication Data

US 2015/0088550 A1 Mar. 26, 2015

(51) Int. Cl.
*G06Q 40/08* (2012.01)

(52) U.S. Cl.
CPC .................. *G06Q 40/08* (2013.01)

(58) Field of Classification Search
CPC ..................................................... G06Q 40/08
USPC ..................................................... 705/4, 1.1
See application file for complete search history.

(56) References Cited

U.S. PATENT DOCUMENTS

| | | | |
|---|---|---|---|
| 3,878,915 A * | 4/1975 | Purland | B60K 31/00 123/350 |
| 5,357,438 A | 10/1994 | Davidian | |
| 5,581,464 A | 12/1996 | Woll et al. | |
| 5,951,620 A * | 9/1999 | Ahrens | G01C 21/26 701/450 |
| 5,983,161 A | 11/1999 | Lemelson et al. | |
| 6,223,125 B1 | 4/2001 | Hall | |
| 6,268,803 B1 | 7/2001 | Gunderson et al. | |
| 6,275,773 B1 | 8/2001 | Lemelson et al. | |
| 6,487,500 B2 | 11/2002 | Lemelson et al. | |
| 6,703,944 B1 | 3/2004 | Obradovich | |
| 6,975,932 B2 | 12/2005 | Obradovich | |
| 7,359,821 B1 | 4/2008 | Smith et al. | |
| 7,523,159 B1 * | 4/2009 | Williams | G01M 15/04 701/31.4 |
| 8,014,917 B2 | 9/2011 | Hagenbuch | |

(Continued)

*Primary Examiner* — William E Rankins

(57) ABSTRACT

A vehicle may be configured to determine a characteristic of a software program operating on the vehicle. The characteristic may be provided to an insurer, and the insurer may determine a property of an insurance policy based on the characteristic. The characteristic may be, for example, a feature, a setting, and/or a version of the software program. The insurer may indicate to a vehicle operator and/or owner how changing the characteristic may affect the property of the insurance policy. The insurance policy may be formalized and agreed to by the insurer and/or the insured. The vehicle may also or instead save pre-collision status data, such adjustable parameters, internal variables, dynamic decisions, and/or identification of a software program, when a collision is detected. The pre-collision status data may be used to diagnose problems with the software program, determine fault, and/or determine future properties of insurance policies.

30 Claims, 14 Drawing Sheets

(56) References Cited

U.S. PATENT DOCUMENTS

| | | | |
|---|---|---|---|
| 8,140,358 B1* | 3/2012 | Ling | G06Q 40/08 705/4 |
| 8,428,973 B1* | 4/2013 | Hopkins, III | G06Q 40/08 705/2 |
| 8,442,715 B2 | 5/2013 | Hagenbuch | |
| 8,520,695 B1 | 8/2013 | Rubin et al. | |
| 9,805,423 B1* | 10/2017 | Konrardy | H04W 4/90 |
| 2002/0022927 A1 | 2/2002 | Lemelson et al. | |
| 2002/0055861 A1 | 5/2002 | King et al. | |
| 2002/0105423 A1 | 8/2002 | Rast | |
| 2002/0111725 A1* | 8/2002 | Burge | G06Q 40/08 701/31.4 |
| 2004/0185842 A1* | 9/2004 | Spaur | B60R 25/04 455/420 |
| 2005/0107898 A1* | 5/2005 | Gannon | G06F 21/10 700/90 |
| 2006/0043712 A1 | 3/2006 | Hakki et al. | |
| 2007/0018800 A1 | 1/2007 | Boss et al. | |
| 2007/0080825 A1 | 4/2007 | Shiller | |
| 2007/0150140 A1 | 6/2007 | Seymour | |
| 2008/0126137 A1 | 5/2008 | Kidd et al. | |
| 2008/0243342 A1 | 10/2008 | Breed | |
| 2009/0024274 A1 | 1/2009 | Nagai | |
| 2010/0045452 A1* | 2/2010 | Periwal | B60Q 9/00 340/439 |
| 2010/0063736 A1 | 3/2010 | Hoetzer | |
| 2010/0131305 A1* | 5/2010 | Collopy | G06Q 30/0224 705/4 |
| 2010/0201819 A1 | 8/2010 | Minowa | |
| 2010/0208070 A2 | 8/2010 | Haynes et al. | |
| 2010/0250021 A1* | 9/2010 | Cook | G07C 5/085 701/1 |
| 2011/0006886 A1 | 1/2011 | Park | |
| 2011/0071859 A1* | 3/2011 | Keefer | G06Q 40/08 705/4 |
| 2011/0160978 A1* | 6/2011 | Yuzawa | B60W 10/06 701/93 |
| 2012/0076437 A1 | 3/2012 | King | |
| 2012/0083960 A1* | 4/2012 | Zhu | G06T 7/223 701/23 |
| 2012/0109446 A1 | 5/2012 | Yousefi et al. | |
| 2012/0109447 A1 | 5/2012 | Yousefi et al. | |
| 2012/0123806 A1* | 5/2012 | Schumann, Jr. | G06Q 40/08 705/4 |
| 2012/0253552 A1* | 10/2012 | Skelton | B60K 28/063 701/2 |
| 2013/0035827 A1 | 2/2013 | Breed | |
| 2013/0151111 A1* | 6/2013 | Skelton | B60R 25/00 701/99 |
| 2013/0218433 A1 | 8/2013 | Matsuno | |
| 2013/0218603 A1* | 8/2013 | Hagelstein | G06Q 40/08 705/4 |
| 2013/0218604 A1* | 8/2013 | Hagelstein | G06Q 40/08 705/4 |
| 2013/0300552 A1 | 11/2013 | Chang | |
| 2013/0304513 A1* | 11/2013 | Hyde | G06Q 40/08 705/4 |
| 2013/0338878 A1 | 12/2013 | Fritz et al. | |
| 2014/0009275 A1 | 1/2014 | Bowers et al. | |
| 2014/0009307 A1 | 1/2014 | Bowers et al. | |
| 2014/0012492 A1 | 1/2014 | Bowers et al. | |
| 2014/0282467 A1* | 9/2014 | Mueller | G06F 8/66 717/170 |
| 2015/0210280 A1 | 7/2015 | Agnew et al. | |

* cited by examiner

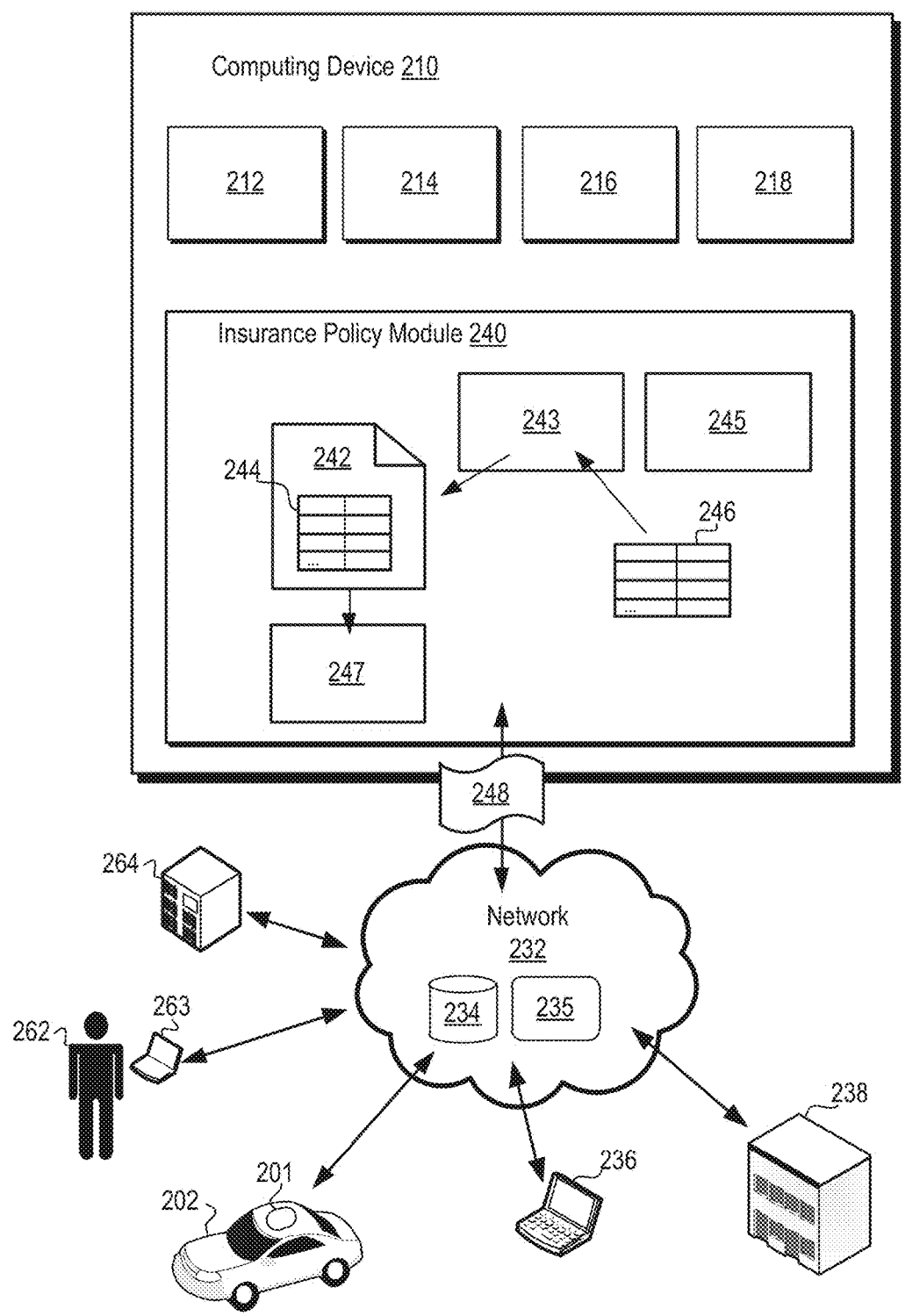

SYSTEMS AND METHODS FOR INSURANCE BASED UPON STATUS OF VEHICLE SOFTWARE

If an Application Data Sheet ("ADS") has been filed on the filing date of this application, it is incorporated by reference herein. Any applications claimed on the ADS for priority under 35 U.S.C. §§ 119, 120, 121, or 365(c), and any and all parent, grandparent, great-grandparent, etc., applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc., applications of the Priority Application(s)). In addition, the present application is related to the "Related Applications," if any, listed below.

PRIORITY APPLICATIONS

None

RELATED APPLICATIONS

U.S. patent application Ser. No. 14/033,062, entitled SYSTEMS AND METHODS FOR INSURANCE BASED UPON STATUS OF VEHICLE SOFTWARE, naming Jeffrey A. Bowers, Peter L. Hagelstein, Roderick A. Hyde, Muriel Y. Ishikawa, Jordin T. Kare, Clarence T. Tegreene, Lowell L. Wood, Jr., and Victoria Y. H. Wood as inventors, filed 20 Sep. 2013, is related to the present application.

The United States Patent Office ("USPTO") has published a notice to the effect that the USPTO's computer programs require that patent applicants both reference a serial number and indicate whether an application is a continuation, continuation-in-part, or divisional of a parent application. Stephen G. Kunin, Benefit of Prior-Filed Application, USPTO Official Gazette, Mar. 18, 2003. The USPTO further has provided forms for the ADS which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

This application relates to systems and methods for determining insurance properties based upon the status of a software program operating on a vehicle.

SUMMARY

A vehicle may determine characteristics of a software program operating on the vehicle. Information pertaining to the characteristics of the software program may be provided to an insurer by the vehicle. Based on the information pertaining to the characteristics of the software program, the insurer may determine properties of an insurance policy. The insurer may thus explicitly or implicitly encourage an owner or operator of the vehicle to modify the characteristics to reduce the risk of a collision. The insurance policy may be formalized and/or agreed to by an insurer and/or an insured.

A vehicle may be configured to store pre-collision status data from a software program, such as a collision avoidance software program, upon or after detection of a collision. The pre-collision status data may include adjustable parameters, modeling parameters, internal variables, dynamic decisions, errors/exceptions, and/or the like for the software program. The pre-collision status data may be used to determine fault of a vehicle operator, the software program, and/or the like for the accident. The pre-collision status data may be used by the insurer to make future decisions about properties of insurance policies for similar software programs and/or configurations of software programs.

An "insurance policy" may refer to a risk-transference contract between an insurer and an insured (policy provider and policy holder) in which the insurer agrees to satisfy qualifying claims brought by the insured. An insurance policy may include, but is not limited to, one or more of: a vehicle insurance policy, a health insurance policy, a life insurance policy, a disability insurance policy, a workers' compensation insurance policy, a group insurance policy, or the like. The "insurer" may be any entity responsible for satisfying claims under the insurance policy, and may include an agent of the insurer (e.g., employee, independent contractor, or other authorized entity), an underwriter, a re-insurer, or the like. As used herein, an insurance policy may pertain to any asset or entity including, but not limited to: a vehicle, a fleet of vehicles, an operator of a vehicle, a passenger of a vehicle, an owner of a vehicle, an entity having a security interest in a vehicle, an entity having a relationship with an operator, a passenger, and/or an owner of the vehicle (e.g., an employer of the vehicle operator), and so on. As used herein, a "property" of an insurance policy includes, but is not limited to, one or more of: a term of the insurance policy, eligibility for coverage under the insurance policy, a premium of the insurance policy, a coverage amount of the insurance policy, a deductible of the insurance policy, a rider of the insurance policy, a limitation of the insurance policy, a coverage scope of the insurance policy, the coverage of a particular event under the insurance policy, or the like. Although the specific example of insurance policies are disclosed herein, the disclosure is not limited in this regard and could be adapted to any suitable risk-transference and/or risk-mitigation mechanisms.

BRIEF DESCRIPTION OF THE DRAWINGS

FIG. 2 is a block diagram of one embodiment of a system for determining one or more properties of an insurance policy based upon characteristics of a software program in a vehicle.

DETAILED DESCRIPTION OF PREFERRED EMBODIMENTS

Figure 1:
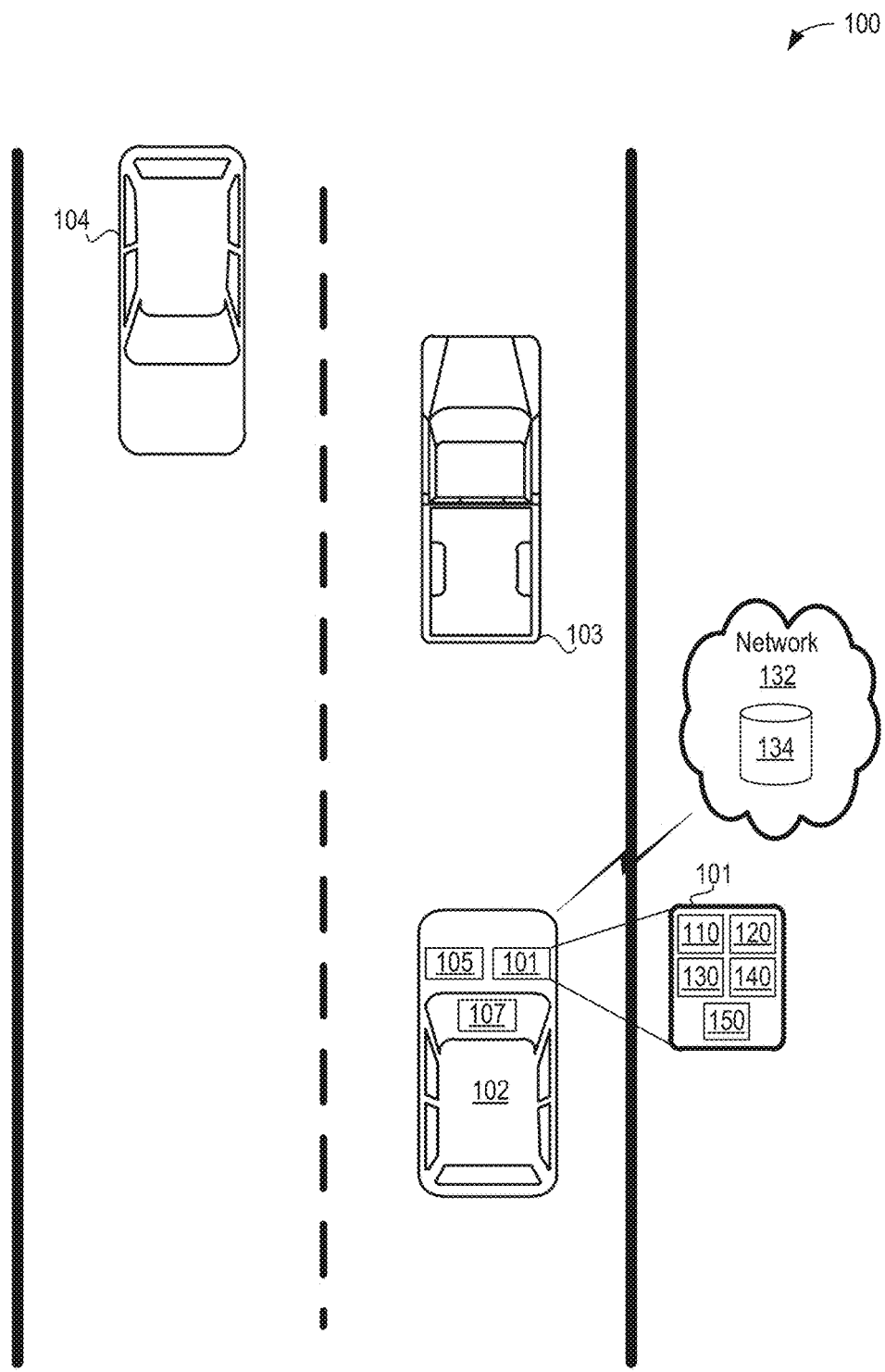
FIG. 1 is a block diagram depicting one embodiment of an exemplary computer system operating on a ground vehicle.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

An insurer may determine one or more properties of an insurance policy based on a characteristic of a software program operating on a computer system of a vehicle. The vehicle may include a status module that monitors the characteristic of the software program and a communications module that provides information pertaining to the characteristic to the insurer. The insurer may include a communications module that receives the information provided by the vehicle and an insurance module that determines the property of the insurance policy based on the information pertaining to the characteristic.

The software program may control one or more vehicle functions, systems, and/or the like. The software program may control a safety system, such as an airbag system. The software program may control a collision avoidance system. The collision avoidance system may be an active collision avoidance system, a passive collision avoidance system, such as antilock brakes, and/or the like. The software program may automatically control maneuvering of the vehicle. The software program may control an external sensor, such as radar, lidar, an image sensor, and/or the like. Controlling the external sensor may include controlling a property of the external sensor, such as a scan direction, a range setting, a sensitivity, and/or the like. The software program may control image recognition from sensor data received from the external sensor. The software program may control a prediction/planning algorithm. The prediction/planning algorithm may predict a likely action by another vehicle, plan an evasive action by the vehicle, and/or the like. The software program may control a mapping function, such as controlling a road map, controlling location-based metadata (e.g., a speed limit at a particular location), and/or the like. The software program may also, or instead, control receipt of traffic information, such as receipt of general updates, display of nearby traffic on a heads-up display, and/or the like.

The software program may control one or more functions and/or systems that improve driving performance of a vehicle operator. The software program may govern vehicle performance, such as governing a maximum speed, governing a maximum acceleration, governing braking, and/or the like. The software program may control driver impairment detection. The software program may detect when the driver is distracted, drowsy, suffering a medical impairment, impaired by a substance (e.g., drunk), and/or the like. The software program may control a communication system, such as a hands-free system. The software program may control an entertainment system, such as an audio system, an audiovisual system, and/or the like.

Various characteristics of software programs may be used to determine the insurance policy. The characteristic may be a setting of the software program, such as a setting set by a user and/or a provider of the software program. The characteristic may be the type of software program (e.g., the property of the insurance policy may be based on whether a software program performing a particular function is operating on the vehicle). Alternatively, the property of the insurance policy may be based upon an inherent characteristic of the software program that is not adjustable by the user, not dependent on performance of a vehicle operator, and/or not dependent on the type of software. The characteristic may be a feature of the software program, such as an internal feature or, alternatively, a feature that leverages a corresponding hardware feature, a corresponding firmware feature, and/or the like. The characteristic may be whether a particular feature is enabled or disabled.

The characteristic may be determined from an identifier for the software program. The identifier may include a manufacturer, a model number, a serial number, a universal product code, a version number, a revision number, a firmware revision number, and/or the like for the software program. The identifier may include a make, model, style, trim, add-on package, year, and/or the like for the vehicle. The characteristic may be a version of the software program, which may be indicated by a version number, and/or the characteristic may be determined from the version of the software program. The insurance module may compare the version of the software program to a recommended version to determine the property of the insurance policy. The insurer may transmit an indication the software program should be upgraded to the vehicle owner, the vehicle operator, the vehicle, and/or the like. The insurer may determine a contract address for, e.g., the vehicle owner and transmit the indication that the software should be upgraded to the contact address. The insurer may also transmit and indication of what the differences in the property of the insurance policy would be for different versions of the software program.

The insurance policy may be a vehicle insurance policy (e.g., a policy that insures the owner, the operator, a holder of a security interest, etc.). The insurance policy may be a health insurance policy of the owner, the operator, a passenger, and/or the like. The insurance policy may be a life insurance policy for the owner, the operator, the passenger, and/or the like. The insurance policy may be a short and/or long term disability policy for the owner, the operator, the passenger, and/or the like. The insurance policy may be a workers' compensation policy for the owner and/or an employer of the owner, the operator, the passenger, and/or the like. The insurance policy may cover a group of individuals, such as the operators and passengers of the vehicle. Alternatively, the insurance policy may cover only a single individual. The insurance policy may cover a fleet of vehicles. Each vehicle may have its own software program, which may or may not be the same as the software program on other vehicles in the fleet.

The property of the insurance policy may include whether an insured qualifies and/or is eligible for the insurance policy. The property may include a coverage scope of the insurance policy. The coverage scope may include, for example, the coverage amount, one or more coverage limitations, and/or the like. The property may include a deductible, premium, coinsurance, and/or the like for the insured. The property may include the term of the insurance policy (e.g., a length of time the policy is valid, cannot be canceled, can be renewed without additional underwriting, etc.). The property of the insurance policy may include a rider of the insurance policy. The property of the insurance policy may include coverage of a particular event, such as a historic event, a possible future event, and/or the like.

The characteristic of the software program may be operator specific. For example, the characteristic may change depending on who is operating the vehicle. The characteristic may depend on a driving record, an operating history, and/or the like for the operator. The property of the insurance policy may depend on the characteristic for an operator of interest. The property of the insurance policy may be determined based on the characteristic for each of a plurality of operators, such as by weighting the property and/or the characteristic based on relative usage of the vehicle by the plurality of operators. Each of the plurality of operators may have a characteristic dependent on a corresponding driving record. The characteristic may depend on the number of operators using the vehicle, the number of occupants of the vehicle, and/or the like. In some embodiments, the operator-specific characteristic may affect vehicle performance.

The insurance module may determine the property of the insurance policy when the insurance policy is underwritten, when the software program is purchased, when the software program is upgraded, and/or the like. The status module on the vehicle may monitor the characteristic periodically; aperiodically; in response to a request from the user, the insurer, and/or a third party; and/or the like. Alternatively, or in addition, the insurance module may monitor the characteristic of the software program during vehicle operation and dynamically adjust the property of the insurance policy based on the monitored characteristic.

In an embodiment, the vehicle may monitor and transmit real-time information pertaining to the characteristic of the software program during vehicle operation. Alternatively, or in addition, the vehicle may transmit a history of the real-time information pertaining to the characteristic to the insurer, and/or the insurer may be able to access the history of the real-time information. The history of the real-time information may include time after the user has been informed the characteristic will affect the property of the insurance policy, such as including a grace period.

The property of the insurance policy may be at least partially based on external conditions associated with the vehicle. The external condition may be a time of day, day of the week, date, location, and/or the like. The external condition may be a lighting condition, a visibility condition, and/or the like. The external condition may be a weather condition. The external condition may be a traffic condition, a construction condition, a road condition, and/or the like. The property may also be based on whether mitigation measures, such as lights, windshield wipers, automatic collision avoidance software, and/or the like, have been automatically and/or manually enabled.

The vehicle may transmit the information pertaining to the characteristic and/or the real-time information, the history of the real-time information, and/or the external condition to the insurer using a communications network, such as a wireless data network, a satellite communication network, and/or the like. In an embodiment, the insurer may request the information pertaining to the characteristic from the vehicle, and the vehicle may transmit the information to the insurer, such as by directly transmitting the information. Alternatively, or in addition, the vehicle may transmit the information to a third party, and the insurer may receive the information from the third party. The insurer may receive the information from a provider of the software program. The insurer may receive the information when the program is purchased, successfully installed (e.g., validated through a website), upgraded, and/or the like. Alternatively, or in addition, the provider may send the information in response to a request from the insurer.

The vehicle may store the information on a network-accessible storage medium, which may or may not be accessible by the insurer. The vehicle may also, or instead, store the information on a persistent, machine-readable storage medium, such as a local, persistent, machine-readable storage medium. The vehicle may store the information locally until it is transmitted and/or requested by the insurer, for a fixed duration, until space is needed, and/or the like. The insurer may also, or instead, store a history of the characteristic of the software program.

The insurer may determine the property of the insurance policy based on the history of the characteristic. The history may include time after the user has been informed the characteristic will affect the property of the insurance policy, such as including a grace period. The history may include an indication of a configuration of the software program during an operating time of the vehicle. The history may include a comparison of operating time when the software program was active versus when the software program was inactive, operating time when the characteristic was in a first state versus a second state (e.g., a feature was enabled, a particular settings was used, etc.), a number of uses in the first state versus the second state, and/or the like.

Once the property of the insurance policy has been determined, information pertaining to the property may be provided to the operator of the vehicle, the owner of the vehicle, the vehicle, a passenger, an employer, and/or the like. For example, the insurer may provide real-time advice on the effect of the characteristic on the property of the insurance policy. The insurer may send an alert to the operator of the vehicle indicating the effect of the characteristic on the property. The alert may include text, such as an email, a short message service (SMS) message, a letter, and/or the like. The alert may specify a grace period before the property of the insurance policy changes. The alert may be sent to a portable communication device (e.g., a mobile phone, a smart phone, and/or the like) of the operator of the vehicle. Alternatively, or in addition, a signaling module may receive the alert and provide the alert to a user. The alert may include an audio alert, a haptic alert, a visual alert, and/or the like. A visual alert may include a visual indication of a change in the property of the insurance policy on a heads-up display of the vehicle.

The insurance module may formalize the insurance policy. The insurance policy and/or the property of the insurance policy may be provided to the insurer and/or the insured of the insurance policy. The insured and/or the insurer may provide to insurance module an indication that the insured and/or insurer accepts the insurance policy and/or the property of the insurance policy. The insurance module may generate a document indicating the property of the insurance policy. The insurance module may provide the document to the insured, the insurer, an authorized entity of the insured and/or insurer, and/or the like. The indications of acceptance of the property of the insurance policy by the insured, the insurer, and/or both may be provided in response to the document.

Some and/or all of the communications between the insurer and the vehicle, operator, owner, and/or the like may be encrypted. Communications may also, or instead, include a cryptographic signature from the insurer, the vehicle, the operator, the owner, and/or the like. Correspondingly, recipients of communications may be able to decrypt communications and/or verify cryptographic signatures. In some embodiments, the insurer may verify the characteristic of the software program. For example, the insurer may authenticate the source of the characteristic by authenticating a credential provided by the vehicle, verifying the cryptographic signature, encrypting communications, and/or the like.

A vehicle may include a durable, onboard, data-recording device (e.g., a black box). The vehicle may include a collision detection module that detects when the vehicle is involved in a collision and a storage module that saves pre-collision status data. The pre-collision status data may be from a collision avoidance software program operating on a computer system of the vehicle. Alternatively, or in addition, the pre-collision status data may be transmitted to an insurer for saving.

The pre-collision status data may include an identification of the software program. The identification may be a manufacturer, a model number, a serial number, a universal product code, a version number, a revision number, a firmware revision number, and/or the like for the software program. Alternatively, or in addition, the identification of the software program may include a make, model, style, trim, add-on package, year, and/or the like for the vehicle, and/or the vehicle information may be included in the pre-collision status data for a purpose other than identifying the software program.

The pre-collision status data may include one or more adjustable parameters and/or values for the one or more adjustable parameters. The one or more adjustable parameters may include a manufacturer-set adjustable parameter, a user-set adjustable parameter, an adjustable parameter set by a software update, and/or the like. The one or more adjustable parameters may include a type of an active sensor, a selectable range for a sensor, one or more filter values for filtering sensor data, one or more weights to be applied to sensor data, a sampling interval for a sensor, a rejection threshold for a sensor, and/or the like. The one or more adjustable parameters may include which types of vehicle data are gathered, weights for gathered vehicle data, one or more sampling intervals for gathered vehicle data, one or more rejection thresholds for gathered vehicle data, and/or the like.

The one or more adjustable parameters may include one or more parameters used in computing a collision avoidance decision. The one or more parameters used in computing the collision avoidance decision may include a parameter indicating object types to avoid, a parameter specifying how aggressively to avoid a collision, a risk tolerance parameter, a risk-damage tradeoff parameter, and/or the like. The one or more adjustable parameters may include an avoidance maneuver type, one or more occupant-based maneuver limits (e.g., a driver-based maneuver limit, a maneuver limit for each occupant, etc.), and/or the like. The one or more adjustable parameters may include one or more parameters of a physics model (e.g., a mass, a friction coefficient, etc.). The physics model parameter may be used to predict a path of the vehicle, predict a path of a target object, and/or the like.

The one or more adjustable parameters may include one or more collision modeling parameters. The one or more collision modeling parameters may include a detail level for collision modeling, a make-specific structural vehicle model, a generic structural vehicle model, a damage threshold, and/or the like. The one or more adjustable parameters may include one or more parameters for a collision mitigation system. The one or more parameters for the collision mitigation system may include an activation threshold for an external mitigation (e.g., deployment of an external airbag, extension of an extendable bumper, etc.), an activation threshold for an internal mitigation (e.g., deployment of an internal airbag, locking a passenger restraint, etc.), and/or the like.

The one or more adjustable parameters may include a warning threshold at which a pre-collision warning is signaled. The warning threshold may be based upon a probability of collision, based upon an estimated time until a collision, and/or the like. The warning may be signaled to a vehicle operator, to another vehicle, to a collision avoidance countermeasure, and/or the like. The one or more adjustable parameters may include a warning type. The warning type may be of the type of a warning signaled to the vehicle operator, to the other vehicle, to the collision avoidance countermeasure, and/or the like. The warning type may be an urgency of the warning, which areas of the vehicle the collision avoidance countermeasure receives control of, whether the collision avoidance countermeasure receives full control, and/or the like.

The pre-collision status data may include an operational state of the software program. The operational state may include an indication of whether the software program was enabled, kinematics of the vehicle, kinematics of another vehicle, operator control inputs, and/or the like. The pre-collision status data may include values of one or more internal variables of the software program. The internal variables may include, for example, a variable for computing a collision avoidance decision, a confidence score for a collision avoidance action, and/or the like. The pre-collision status data may include a dynamic decision made by the software program (e.g., a collision avoidance decision). The pre-collision status data may include an error and/or exception thrown by the software program and may include a memory dump.

In an embodiment, the storage module may continuously capture instantaneous status data from the software program and store the captured status data in a history window for a predetermined time period. The storage module may sample the instantaneous status data at a predetermined rate to produce the captured instantaneous status data. The history window may be a queue that is continuously updated with newly captured instantaneous status data. The storage module may save the captured status data that is in the history window when the collision is detected and/or a predetermined time delay after the collision is detected (e.g., the history window may continue to update for a predetermined time after the collision). The captured status data that is in the history window may be saved to a persistent, machine-readable storage medium. Alternatively, or in addition, all captured instantaneous status data may be saved regardless of when it was captured. The captured instantaneous status data may be saved local to the vehicle, and/or the captured instantaneous status data may be transmitted to an insurer or to a third-party, which may save the status data, for example, to a persistent machine-readable storage medium.

The vehicle may transmit the pre-collision status data to the insurer, and the insurer may determine culpability from the received pre-collision status data. For example, the insurer may determine a culpability level of the vehicle operator for the collision based on the pre-collision status data. The insurer may also, or instead, determine the culpability level of the software program (e.g., the culpability level of a collision avoidance software program). The insurer may use pre-collision status data and/or culpability determinations for software programs having certain characteristics to decide how properties of insurance policies should be affected by software programs having similar characteristics.

Embodiments may include various steps, which may be embodied in machine-executable instructions to be executed by a computer system. A computer system comprises one or more general-purpose or special-purpose computers (or other electronic device). The computer system may comprise hardware components that include specific logic for performing the steps or comprise a combination of hardware, software, and/or firmware.

Embodiments may also be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD ROMs, DVD ROMs, ROMs, RAMs, EPROMs, EEPROMs, magnetic or optical cards, solid-state memory devices, or other types of media/computer-readable medium suitable for storing electronic instructions.

Computer systems and the computers in a computer system may be connected via a network. Suitable networks for configuration and/or use as described herein include one or more local area networks, wide area networks, metropolitan area networks, and/or "Internet" or IP networks, such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may comprise a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

The network may include communications or networking software, such as the software available from Novell, Microsoft, Artisoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Each computer system includes at least a processor and a memory; computer systems may also include various input devices and/or output devices. The processor may include a general purpose device, such as an Intel®, AMD®, or other "off-the-shelf" microprocessor. The processor may include a special purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer executable code located within a memory device. A software module may, for instance, comprise one or more physical or logical blocks of computer instructions, which may be organized as a routine, program, object, component, data structure, etc., that perform one or more tasks or implement particular abstract data types.

In certain embodiments, a particular software module may comprise disparate instructions stored in different locations of a memory device, different memory devices, or different computers, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as: general purpose computers; computer programming tools and techniques; computer networks and networking technologies; digital storage media; authentication; access control; and other security tools and techniques provided by public keys, encryption, firewalls, and/or other means.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

FIG. 1 is a block diagram 100 depicting one embodiment of an exemplary computer system 101 operating on a ground vehicle 102, such as a car, truck, bus, train, or any other type of vehicle. The computer system 101 may include a software program 110 configured to operate on a processor 120. The software program 110 may be communicatively coupled to a vehicle control system 105 and may operate and/or interact with the vehicle control system 105. As used herein, a vehicle "control system" refers to a system for providing control inputs to the vehicle, such as steering, braking (deceleration), acceleration, and so on. The software program 110 may be a collision avoidance and/or automatic-driving software program with partial or full control over the vehicle control system 105. The software program 110 may govern vehicle performance, such as by governing speed, acceleration, braking, and/or the like. In other embodiments, the software program 110 may control a safety system (not shown), a sensor (not shown), and/or the like.

The software program 110 may be communicatively coupled to human-machine interface components 107 of the vehicle. The human-machine interface components 107 may allow the software program 110 and/or another vehicle system to receive information from and/or deliver information to an operator and/or occupant. The human-machine interface components 107 may include, but are not limited to: visual display components (e.g., display screens, heads-up displays, or the like), audio components (e.g., a vehicle audio system, speakers, or the like), haptic components (e.g., power steering controls, force feedback systems, or the like), and so on. The human-machine interface components 107 may include an entertainment system, a hands-free communication system, a mapping and/or traffic reporting system, a driver impairment detection system, and/or the like. The human-machine interface components 107 may allow the software program to deliver an alert to a vehicle operator.

The computer system 101 may include a communications module 130 for communicating with one or more insurers, other vehicles 103, 104, and/or the like. The communications module 130 may include, but is not limited to, one or more: wireless network interfaces, cellular data interfaces, satellite communication interfaces, electro-optical network interfaces (e.g., infrared communication interfaces), wired network interfaces, and/or facilitate physical transport of storage media, and the like. The communications module 130 may be configured to communicate in vehicle-to-vehicle "ad-hoc" networks and/or infrastructure networks 132, such as the Internet. The communications module 130 may cryptographically protect messages, such as by encrypting messages, digitally signing messages, and/or the like, and/or may be able to decode and/or authenticate received messages.

A status module 140 may monitor a characteristic of the software program 110. The characteristic of the software program 110 may be a setting, a type of software, a feature, a version, and/or the like. The status module 140 may be configured to provide the characteristic of the software program to one or more insurers. Providing the characteristics may include storing the characteristics using a storage module 150 (e.g., storing the characteristics on a persistent, machine-readable storage medium), transmitting the characteristics to the insurer via the network 132, transmitting the characteristics to the network-accessible storage device 134, and/or the like. The status module 140 may determine the characteristic by requesting the characteristic from the software program 110, directly accessing a memory location containing data from which the characteristic can be derived, and/or the like.

The computer system 101 may further include a storage module 150 that is configured to store information pertaining to the capabilities, configuration, and/or operating state of the software program 110 (and/or vehicle 102). The storage module 150 may include persistent storage media, such as hard disks, solid-state storage, optical storage media, or the like. The persistent storage media may also store program code for the software program 110, the status module 140, and/or the like, and/or a separate storage media may store the program code for the software program 110 and/or the status module 140. The storage module 150 may be configured to prevent unauthorized access to and/or modification of stored information. Accordingly, the storage module 150 may be configured to encrypt information for storage. The storage module 150 may also provide for validating authenticity of stored information; for example, the storage module 150 may be configured to cryptographically sign stored information.

FIG. 2 is a block diagram of one embodiment of a system 200 for determining one or more properties of an insurance policy based upon characteristics of a software program 201 in a vehicle 202. The system 200 may include a computing device 210, which may include a processor 212, a memory 214, a communication interface 216, and persistent storage 218.

An insurance policy module 240 may operate on the computing device 210. The insurance policy module 240 may be embodied as one or more machine-readable instructions stored on a persistent storage media (e.g., persistent storage media 218) and/or transmitted via a communication network (e.g., network 232). The instructions stored by the insurance policy module 240 may be configured for execution on the computing device 210 (e.g., on the processor 212 of the computing device 210). Alternatively, or in addition, portions of the insurance policy module 240 (as well as the other modules and systems disclosed herein) may be implemented using machine elements, such as processors, ASICs, FPGAs, PALs, PLDs, PLAs, or the like.

The insurance policy module 240 may be configured to determine one or more properties 244 of an insurance policy (insurance policy data structure 242) based upon characteristics 246 of the software program 201.

The insurance policy data structure 242 may include one or more data structures stored on a machine-readable storage medium, such as the persistent storage 218. Alternatively, or in addition, portions of the insurance policy data structure 242 (and/or the properties 244 thereof) may be transmitted and/or communicated on the communication network 232 (e.g., may be stored in a network-accessible persistent storage service 234). The insurance policy data structure 242 may be implemented using any mechanism for representing information including, but not limited to: text (e.g., ASCII text), a database (e.g., as one or more database tables, records, attributes, or the like), markup language (e.g., HTML, XML, delimited text, etc.), or the like. Accordingly, the properties 244 of the insurance policy data structure 242 may include one or more text values, name-value pairs, database elements (e.g., tables, attributes, etc.), XML elements, XML attributes, or the like.

The properties 244 may relate to any aspect of an insurance policy, including but not limited to: eligibility for coverage under the insurance policy, a premium of the insurance policy, a coverage amount of the insurance policy, a deductible of the insurance policy, a rider of the insurance policy, a limitation of the insurance policy, a coverage scope of the insurance policy, the coverage of a particular incident under the insurance policy, or the like.

One or more of the properties 244 may be determined by (e.g., based upon) characteristics 246 of the software program 201. The software program characteristics 246 may be represented in a data structure. The insurance policy module 240 may access the characteristics 246 from a status module (e.g., the status module 140), and/or any suitable data source, which may include, but is not limited to: the persistent storage medium 218; the vehicle (e.g., transmitted directly from the vehicle 202 via a communication interface); a network-accessible storage service 234; a computing device 236 storing information pertaining to the software program 201 (e.g., a manufacturer database, vehicle service center, or the like); another entity 238, such as an insurance agency, insurer, or the like; or any other suitable source of information pertaining to the software program 201 and/or the vehicle 202.

The insurance policy module 240 may determine the properties 244 of the insurance policy data structure 242 using any suitable decision-making mechanism, including, but not limited to: lookup tables, a policy, rules 243, an expert system, a neural network, a machine-learning algorithm, or the like. In some embodiments, the insurance policy module 240 is configured to apply one or more rules 243 to determine properties 244 of the insurance policy data structure 242. For example, one of the rules 243 may specify that a property 244 corresponding to the premium of the insurance policy (e.g., cost of the insurance policy) is reduced by a particular amount (or percentage) in response to a characteristic 246 that indicates that a particular version of the software program 201 is being used. Another one of the rules 243 may specify that the premium property 244 is adjusted based on external characteristics (e.g., weather, visibility, etc.) and/or operator or vehicle specific characteristics of the software program 201. Accordingly, the insurer may promote a particular use of the software program 201 by creating rules 243 that provide incentives for the vehicle operator to maintain the software program 201 in accordance with the insurer's desires.

In some embodiments, the insurance policy module 240 includes a security module 245 that is configured to authenticate and/or verify the characteristics 246. The security module 245 may verify that the characteristics 246 originated from an authorized source (e.g., the software program 201 itself, the status module, authorized personnel, or the like), have not be tampered with (e.g., not modified from their original values), and so on. In some embodiments, the characteristics 246 may include a digital signature (or other security mechanism) that can be used to verify the characteristics 246. Alternatively, or in addition, the characteristics 246 may be transmitted to the insurance policy module 240 via a secure communication mechanism, such as mutually authenticated secure sockets layer (SSL) connection, or the like. The security module 245 may leverage the secure communication mechanism to verify the characteristics 246.

The insurance policy module 240 may be configured to determine the properties 244 of the insurance policy data structure 242 before the insurance policy is in effect (e.g., before the insurer and insured enter into the insurance policy). In some embodiments, the insurance policy module 240 includes a formalization module 247 that is configured to facilitate formalization of the insurance policy. As used herein, formalization refers to the insurer and the insured entering into an insurance policy contract as defined by the insurance policy data structure 242 and/or the properties 244 thereof. Accordingly, the formalization module 247 may be configured to provide the insurance policy data structure 242 (and/or a document 248 corresponding to the data structure 242) to an authorized entity 262 of the insured and/or an authorized entity 264 of the insurer, and receive acceptance therefrom. The authorized entity of the insured 262 and/or insurer 264 may be a person, an automated agent (e.g., computing device), or the like. An authorized entity 262 and/or 264 that is a person may interact with the insurance policy module 240 (and/or formalization module 247) via a computing device 263 (e.g., a laptop, notebook, tablet, smart phone, personal digital assistant, or the like).

The formalization module 247 may be configured to authenticate the identity of the authorized entities 262 and/or 264 and/or verify that the entities 262 and/or 264 are authorized to enter into an insurance policy contract on behalf of the insured and/or insurer. The formalization module 247 may authenticate and/or authorize the entities 262 and/or 264 using a digital signature, password, or other credential. In some embodiments, the formalization module 247 may be configured to authenticate and/or authorize the entities 262 and/or 264 using a network-accessible service 235, which may include, but is not limited to: a certificate authority (e.g., an X.509 certificate authority), an authentication authority, an identity service (e.g., a Security Assertion Markup Language (SAML) authentication authority, a Liberty Alliance Authenticating Authority, an OpenID® provider, a Microsoft Passport® service, a Microsoft Cardspace® service, etc.), or the like.

The formalization module 247 may be configured to provide the insurance policy data structure 242 to the authorized entities 262 and/or 264 via the network 232. In some embodiments, the formalization module 247 may be configured to convert the insurance policy data structure 242 into a different format (e.g., different data format, data encoding, or the like). Alternatively, or in addition, the formalization module 247 may be configured to provide the entities 262 and/or 264 with the insurance policy data structure 242 in a human-readable format, such as a document 248. The document 248 may include an insurance contract that incorporates the properties 244 of the insurance policy data structure 242. The document 248 may be provided to the entities 262 and/or 264 via the network 232 as a web page, email, fax, or the like. The document 248 may be configured for display on a computing device 263. Accordingly, the formalization module 247 may include (and/or be communicatively coupled to) a web server, email server, or the like. Alternatively, or in addition, the formalization module 247 may be configured to provide the entities 262 and/or 264 with a tangible document representing the insurance policy data structure 242 (e.g., a paper copy of an insurance policy).

The formalization module 247 may be further configured to request acceptance of an insurance policy contract in accordance with the insurance policy data structure 242. For example, the document 248 (e.g., insurance policy contract) may include a signature line (or signature input interface) that may receive a signature (or other indication of acceptance) from the authorized entities 262 and/or 264. The signature may include any suitable indication of acceptance, including, but not limited to: selection of an interface element (e.g., selecting a checkbox or other interface element of the document 248), a digital signature, a cryptographic signature, or the like. Alternatively, or in addition, the formalization module 247 may request acceptance via a tangible document (e.g., paper document).

The formalization module 247 may be configured to receive indications of acceptance from the authorized entities 262 and/or 264. The indications may be received via the network 232. Alternatively, or in addition, acceptance may be received via a signature on a tangible document or the like. In response to receiving acceptance from the authorized entities 262 and 264, the formalization module 247 may update the insurance data structure 242. Updating may include indicating that the insurance policy data structure 242 is in effect (or is to go into effect at a particular time and/or under particular circumstances). The updated insurance policy data structure 242 may be stored in a persistent storage medium (e.g., persistent storage medium 218), transmitted via the network 232 (e.g., transmitted to the insured 262 and/or insurer 264), or the like. The formalization module 247 may be further configured to transmit confirmation of the insurance policy to the authorized entities 262 and/or 264.

In some embodiments, the formalization module 247 may indicate how the properties 244 of the insurance policy data structure 242 were determined. This information may allow the insured to reconfigure the software program 201 to obtain favorable terms. Similarly, the insurer may provide advice and/or instructions on what settings, configurations, and/or version of the software program 201 will provide the best terms. For example, the formalization module 247 may indicate that the premium of the policy was determined based, at least in part, on which version of the software program 201 is currently operating on the vehicle 202. In response, the authorized entity 262 and/or the operator may reconfigure and/or update the software program 201 and resubmit the characteristics 246, which may result in a revised set of properties 244 (e.g., lowered premium). The information pertaining to the relationship between insurance policy properties 244 and the software program characteristics 246 may be presented in the document 248. The document 248 may be digitally displayed within the vehicle and/or to remote operators. Authentication, verification, and formalization may occur in real-time, such that an operator may make changes to the software program in real-time in order to dynamically adjust a property of an insurance policy.

Figure 3A:
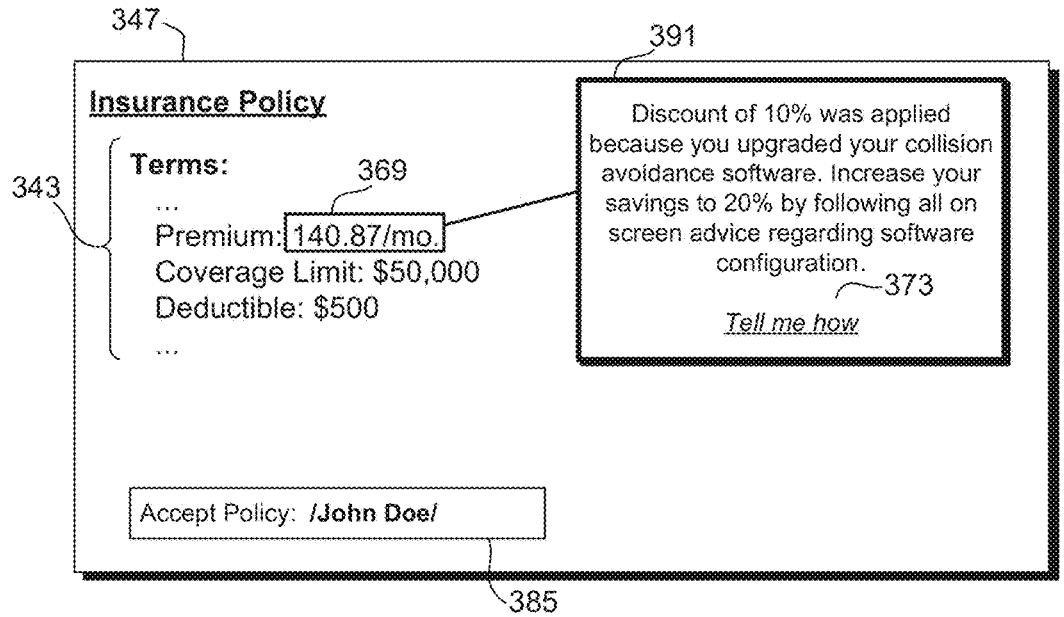
FIG. 3A depicts one example of a document containing information corresponding to the insurance policy data structure.

FIG. 3A depicts one example of a document 347 containing information corresponding to the insurance policy data structure. The document 347 may be embodied as machine-readable data (e.g., markup data or the like), that is adapted for presentation on a display of a computing device. Alternatively, the document 347 may be embodied on a tangible media, such as a disk, Universal Serial Bus (USB) storage device, paper, or the like.

The document 347 may include a human-readable listing of various properties (e.g., terms) 343 of the policy. The document 347 may highlight a particular property 369 that is determined, at least in part, based upon one or more characteristics of the software program. As depicted in the FIG. 3A example, the premium 369 of the policy is based upon the software program characteristics. The document 347 may include information indicating how the premium 369 is affected by software program characteristic. In the FIG. 3A example, the document 347 includes a notice 391 that the premium 369 includes a 10 percent discount due to an upgrade to the version of the software program. The notice 391 indicates that premium 369 may be further reduced by always following on-screen advice with regards to configuring the software program, and may include a link 373 with additional details. Although a particular example of a notice 391 is provided herein, the disclosure is not limited in this regard and could be adapted to use any notification mechanism corresponding to any property 343. For example, in other embodiments, the notice 391 may be communicated in a separate document (e.g., outside of the insurance policy document 347), may include configuration instructions (as opposed to the link 373), and so on. For example, notice 391 may be dynamically displayed during a vehicle operation.

In some embodiments, the document 347 may include an input 385 through which an authorized entity of the insured may indicate acceptance. As shown in the FIG. 3A example, the input 385 may include a text input box. However, the disclosure is not limited in this regard and could be adapted to include any suitable acceptance input, including an assumed acceptance based on the operator following the advice.

In some embodiments, a property 343 of the insurance policy data structure may by dynamic, and may change in response to changes to the characteristics of the software program. Accordingly, the insurance module may be configured to access updated characteristics, re-determine the property, and update the insurance policy data structure accordingly. Updated characteristics may be received continuously during operation of the vehicle. For example, the vehicle computer system may be configured to store and/or transmit characteristics in real-time during operation of the vehicle. Alternatively, or in addition, updated characteristics may be received in a non-continuous and/or non-real-time manner. The characteristics may be received in response to upgrading the software program, servicing the software program and/or vehicle, and/or the like. The updated characteristics may be obtained from the storage module of the computer system, from a network-accessible storage service, from another authorized source, or the like.

The insurance policy module may update a property of the insurance policy data structure in response to updated characteristics. For example, a premium of the insurance policy may be based on the settings of the software program. The premium may be lower when the operator consistently follows insurer provided instructions, or selects certain settings for the software program.

Figure 3B:
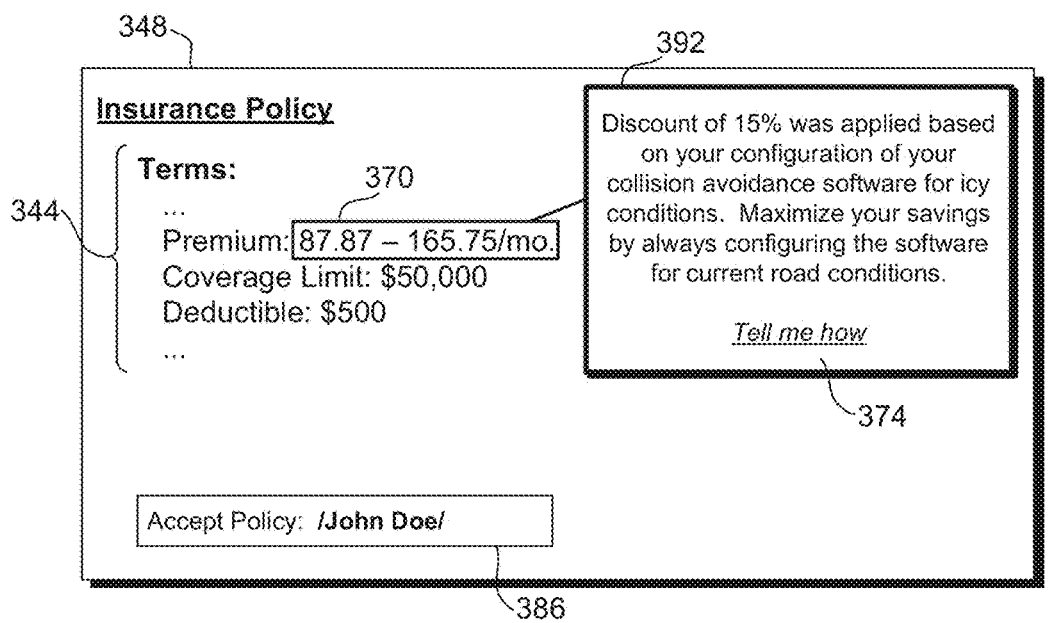
FIG. 3B depicts one example of a document containing information corresponding to a dynamic property of an insurance policy.

FIG. 3B depicts one example of a document 348 containing information corresponding to a dynamic property 370 of an insurance policy. The document 348 may list the properties (e.g., terms) 344 of the insurance policy, as described above. The dynamic term 370 is highlighted, and the notice 392 indicates how the dynamic term 370 is affected by the configuration of the software program. The notice 392 indicates that the insured can minimize the premium 370 by always configuring the software program for current road conditions, and may provide a link 374 to instructions. The document 348 may notify the operator or other authorized entity about how certain properties effect the insurance policy. The document 348 may further include an acceptance input 386, as described above.

Figure 3C:
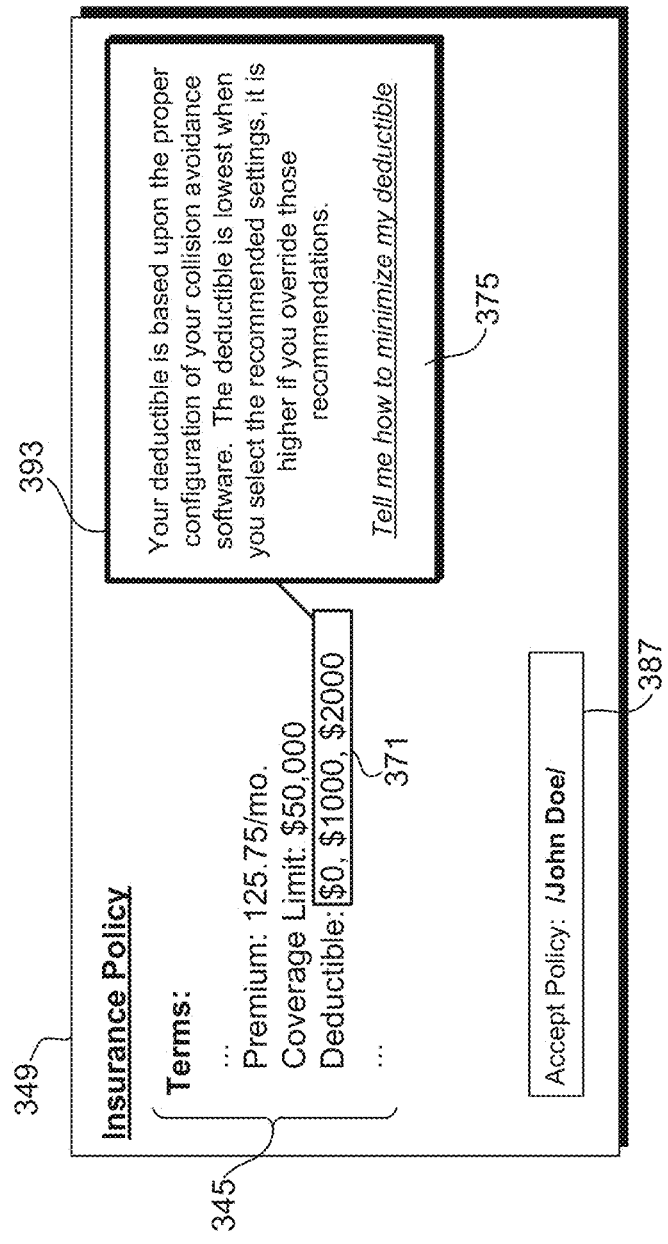
FIG. 3C depicts one example of a document containing information corresponding to an event-specific property.

FIG. 3C depicts one example of a document 349 containing information corresponding to an event-specific property (the insurance policy deductible 371). The document 349 enumerates the properties (e.g., terms) 345 of the policy as described above. The property 371 that defines the coverage of the policy for particular events is highlighted. The property 371 indicates that the deductible for an accident may be $0 to $2,000 depending on the settings of the software program. The notice 393 indicates how the characteristics of the software program and/or operator actions affect the deductible 371. The variable deductible property 371 creates an incentive for the insured to properly configure their software program and keep it up to date. The notice 393 may further include a link 375 to information on how software program characteristics affect properties of the insurance policy, such as the deductible 371.

Figure 4:
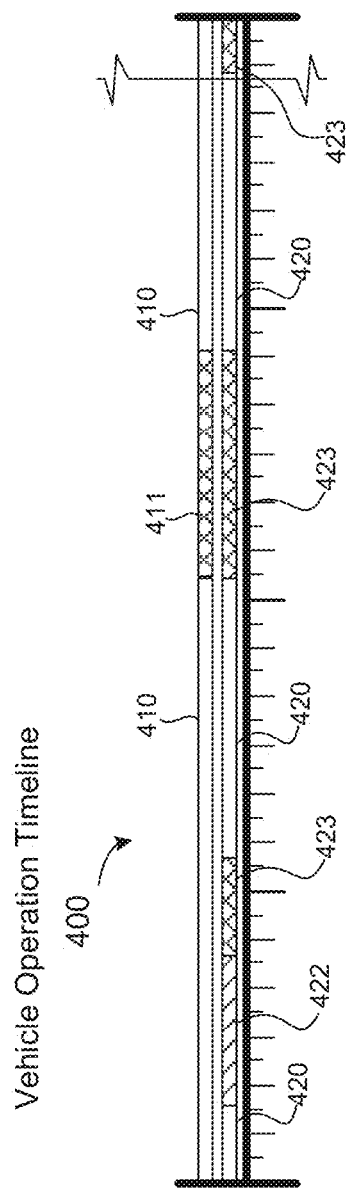
FIG. 4 depicts one example of a history pertaining to the characteristics of a software program.

FIG. 4 depicts one example of a history pertaining to the characteristics of a software program. The data illustrated in FIG. 4 could be included in a data structure for use in determining one or more properties of an insurance policy. The data depicted in FIG. 4 relates to a vehicle operation timeline 400. The timeline 400 may be contiguous (e.g., an "absolute" timeline). Alternatively, the timeline 400 may be discontiguous and include only the time during which the vehicle is in operation (e.g., the vehicle is on or in motion), the software program is enabled, the software program is performing a particular operation, and/or the like. In another example, the timeline 400 may be used to identify the operating state, such as the current settings, current version, etc., of the software program (and/or vehicle) at the time of a particular event.

In the illustrated embodiment, the time regions 410 identify the time during which the software program is enabled (e.g., the software program is operating on a computer system). In some embodiments, unique time regions or identifiers may be used to mark each of a plurality of software program characteristics. The time regions 411 may indicate the time during which the software program was inactive (e.g., not enabled). The history of FIG. 4 may further include data pertaining to the status of particular characteristics of the software program. For example, the time regions 420 may identify the time during which a most recent version of the software program was being used. The time region 422 may identify the time during which an out-of-date version of the software program was operating. Time regions 423 may identify the times during which an operator was advised or notified regarding a (potential) change in a property of an insurance policy based on installing an update to the software program. Although the history of FIG. 4 depicts examples of particular characteristics, the disclosure is not limited in this regard, and the data structure could be adapted to incorporate history data pertaining to any capability, configuration, and/or operating state of the software program, the vehicle, the operator(s), the passenger(s), and/or external conditions.

In some embodiments, data pertaining to the characteristics of the software program may be provided as a ratio or comparison. For example, the data structure may include a value that compares the operation time during which the software program was in a first state (e.g., was a first version of the software, had a first configuration, etc.) versus the time during which the software program was in a second state (e.g., was a second version of the software, had a second configuration, etc.). The comparison value may be derived from the history of FIG. 4. In some embodiments, comparison values may be used in place of, or in addition to, time-based data or logs (e.g., histories).

Figure 5:
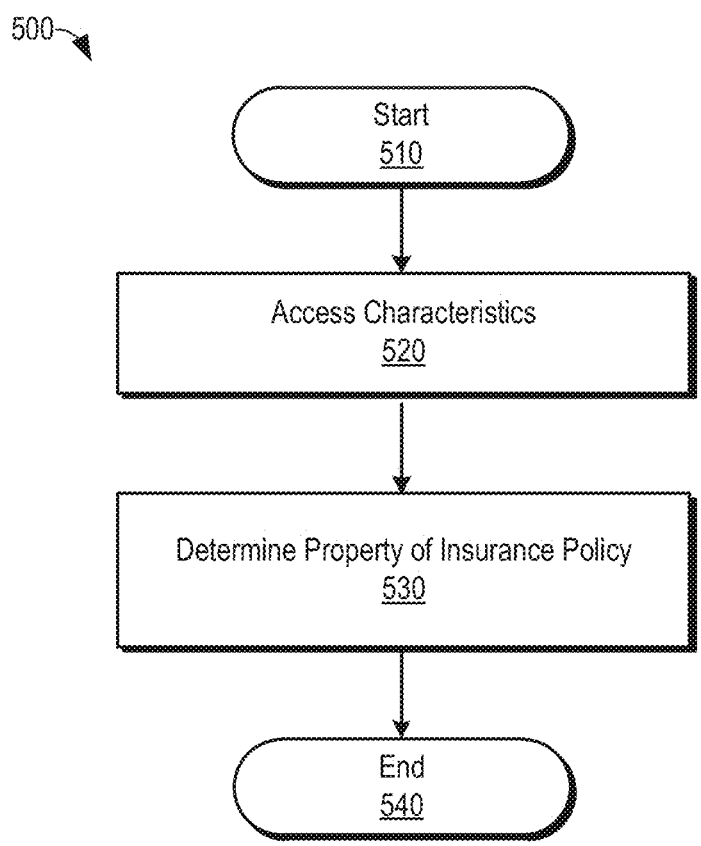
FIG. 5 is a flow diagram of one embodiment of a method for determining a property of an insurance policy based upon information pertaining to a characteristic of a software program.

FIG. 5 is a flow diagram of one embodiment of a method 500 for determining a property of an insurance policy based upon information pertaining to a characteristic of a software program. At step 510, the method 500 begins. Step 510 may include accessing one or more machine-readable instructions in a non-volatile storage media, such as a hard disk, solid-state storage device, or the like. Step 510 may further include accessing one or more machine components, such as network interfaces, data storage resources (e.g., database connections), and so on.

Step 520 may include accessing and/or receiving information pertaining to the characteristics of the software program. Step 520 may include receiving and/or parsing a data structure. The characteristics of step 520 may be received using any data communication mechanism including, but not limited to: receiving the characteristics via a wireless network, a wired network, physical transport of media, reading the characteristics from a machine-readable storage medium, accessing the characteristics from a data storage service (e.g., a database, a network-accessible storage service, etc.), or the like. The characteristics of step 520 may include versions, features, settings, and/or types of the software program and/or the like. Step 520 may further include verifying and/or decrypting the characteristics. The verification may include, but is not limited to: authenticating a sender of the characteristics, verifying a signature on the characteristics, receiving the characteristics via a secure communication mechanism, and so on.

Step 530 may include using the characteristics to determine a property of an insurance policy based, at least in part, upon one or more of the characteristics accessed at step 520. Step 530 may include applying one or more rules to the characteristics to determine the property. Alternatively, or in addition, step 530 may include use of one or more lookup tables, policies, expert systems, neural networks, machine-learning algorithms, or the like. Step 530 may further include storing the insurance policy, and the property thereof, on a persistent storage medium. Step 530 may include updating a property of the insurance policy data structure, providing the property to authorized entities of the insured and/or insurer, receiving acceptance of the insurance policy (e.g., formalizing the insurance policy), and so on. The method ends at step 540.

Figure 6:
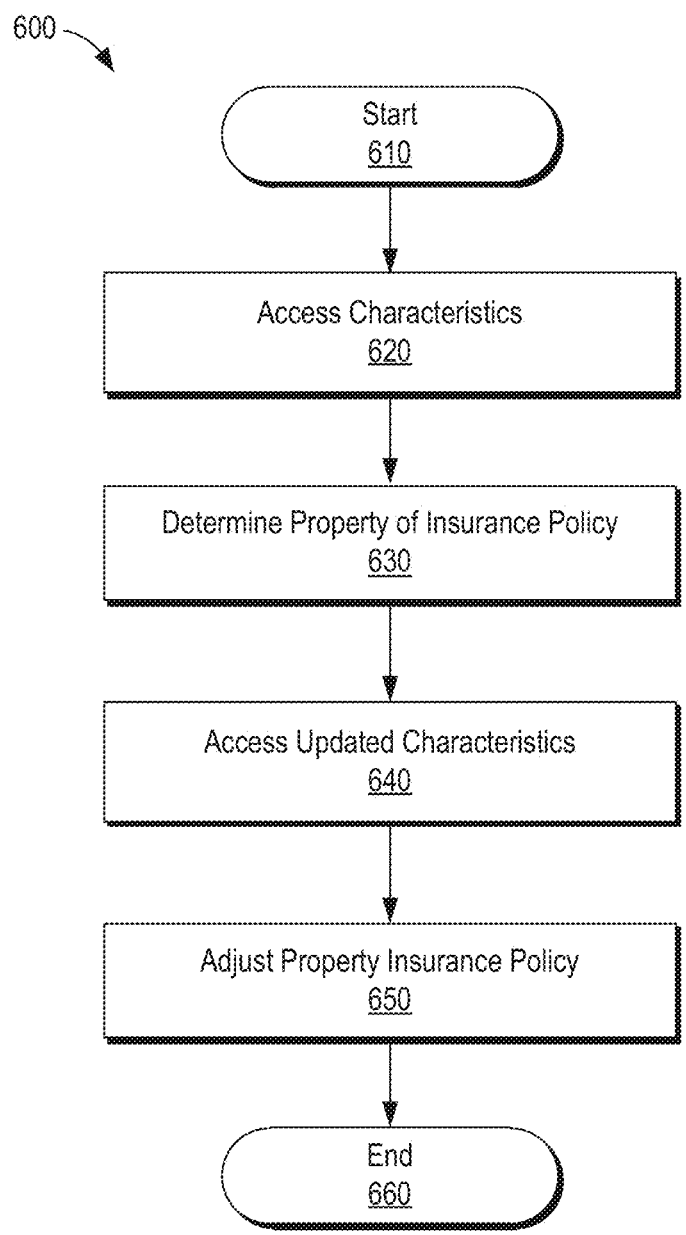
FIG. 6 is a flow diagram of another embodiment of a method for determining a property of an insurance policy based upon information pertaining to a characteristic of a software program of a vehicle.

FIG. 6 is a flow diagram of another embodiment of a method 600 for determining a property of an insurance policy based upon information pertaining to a characteristic of a software program of a vehicle. At step 610, the method 600 is started and initialized, as described above. Steps 620 and 630 may include accessing characteristics pertaining to a software program, and determining a property of an insurance policy, as described above.

Step 640 may include accessing updated characteristics pertaining to the software program, operator(s), passenger(s), vehicle, and/or external condition(s). The characteristics of step 640 may be received in response to continuous, real-time monitoring of the software program. A communications module may be configured to transmit real-time configuration and/or operating state information to an insurance policy module via a network. The updated characteristics may include indications of changes to the configuration of the software program, to the version of the software program, and/or the like.

Alternatively, the characteristics of step 640 may be received in response to a periodic update (non-continuous and/or non-real-time); for example, in response to updating the software program, reconfiguring the software program, servicing and/or updating the vehicle, renewing and/or updating the insurance policy, or the like. The updated characteristics may be obtained from a storage module on the vehicle, from a network-accessible storage service, from another authorized source, or the like. Step 640 may further include verifying and/or decrypting the characteristics, as described above.

Step 650 may include adjusting a property of the insurance policy in response to the updated characteristics of step 640. Adjusting the property may include re-applying one or more rules, applying an expert system (or other automated process), or the like. Step 650 may further include storing the adjusted property on a persistent, machine-readable storage medium, generating document(s) containing the updated property, and so on. In some embodiments, the update may require acceptance from authorized entities of the insured and/or insurer. Accordingly, step 650 may include the formalization module (or other entity) requesting and/or receiving acceptance of the adjusted property. The method ends at step 660, until further updates to the characteristics are received at step 640.

Figure 7:
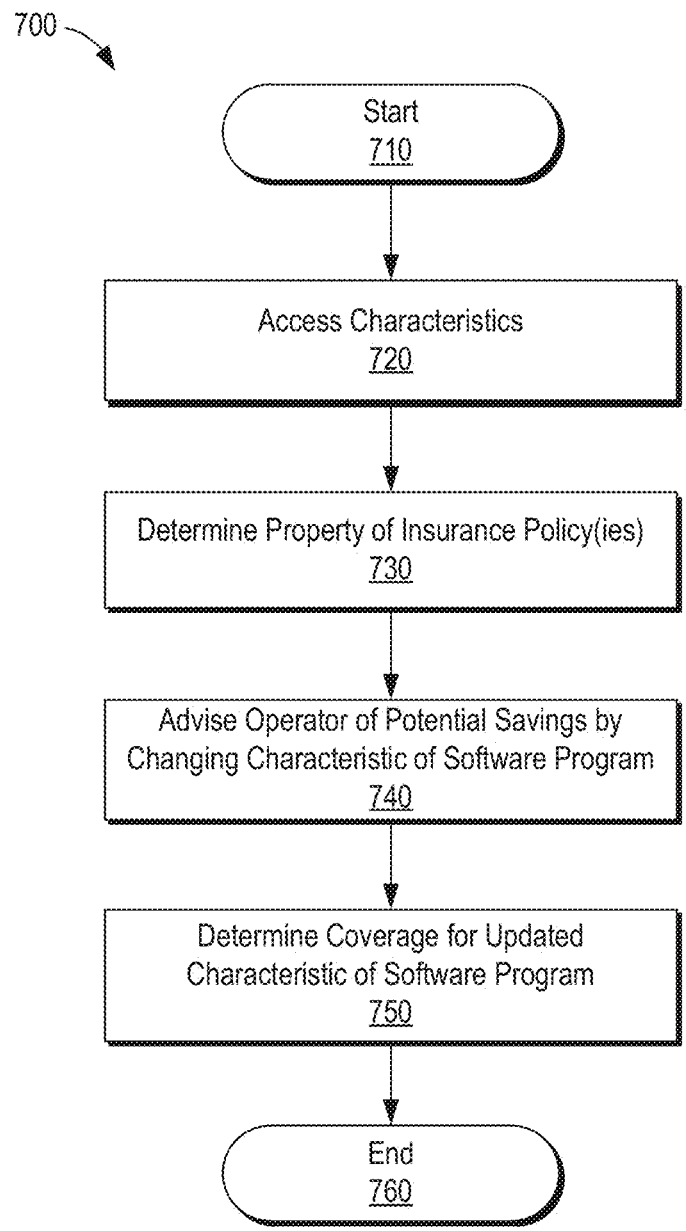
FIG. 7 is a flow diagram of one embodiment of a method for incentivizing operators to modify characteristics pertaining to a software program.

FIG. 7 is a flow diagram of one embodiment of a method 700 for incentivizing operators to modify characteristics pertaining to a software program. At step 710, the method 700 is started and is initialized, as described above. Steps 720 and 730 may include accessing characteristics described above and determining a property of an insurance policy.

Step 740 may include advising an operator, or other entity, of potential savings by changing a characteristic of the software program. For example, an operator may be advised that by updating the software program, the operator may receive more favorable terms for one or more properties of one or more insurance policies. At step 750, the operator, or other entity, may follow the advice, and the coverage (i.e., a property) of the insurance policy may be determined for the new characteristics of the software program. The method ends at step 760. According to various embodiments, the insurance policy may be dynamically updated based on changing characteristics pertaining to the software program, operator(s), passenger(s), vehicle, and/or external condition(s). Similarly, the vehicle may provide advice, notice, and/or warnings about (potential) changes to one or more properties of an insurance policy based on a (potential) characteristic of the software program.

Figure 8:
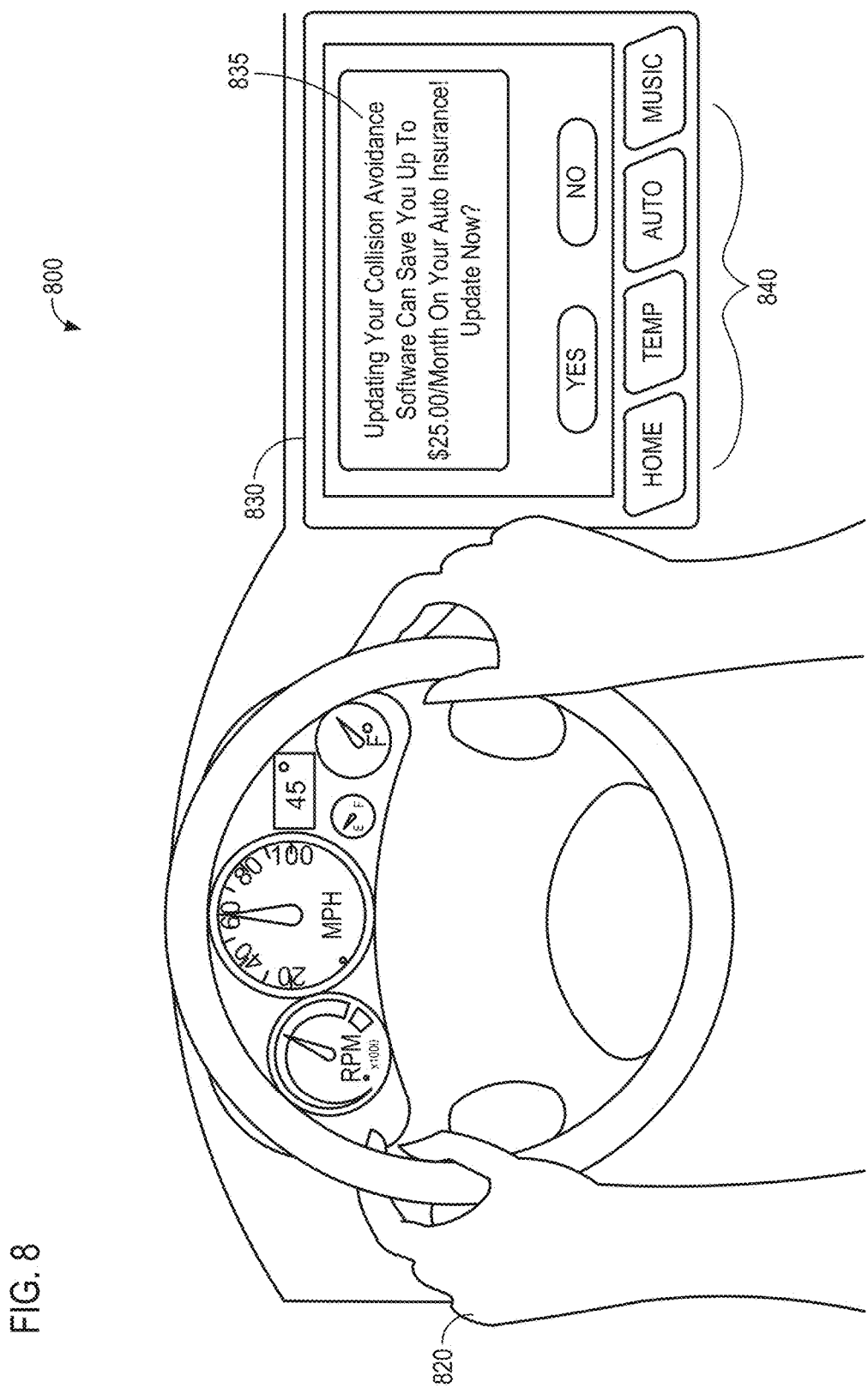
FIG. 8 is a perspective view of a vehicle cockpit.

FIG. 8 is a perspective view of a vehicle cockpit 800. The vehicle cockpit 800 may provide a notice 835 to an operator 820 that a property (e.g., the monthly premium) of an insurance policy could change if a software program is updated. The notice 835 may be provided via a screen 830 that is configured to serve multiple purposes 840. In alternative embodiments, notice and/or selections associated with the software program may be made using other inputs and/or mechanisms in place of screen 830.

Figure 9:
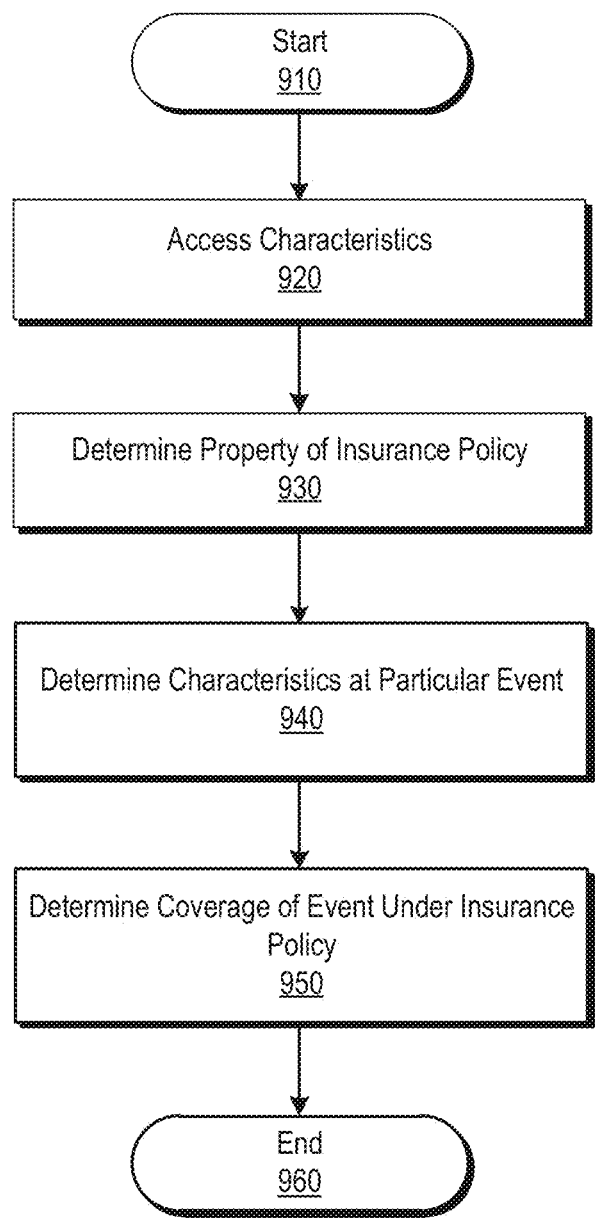
FIG. 9 is a flow diagram of one embodiment of a method for determining the coverage of an event under an insurance policy based, at least in part, on characteristics of a software program.

FIG. 9 is a flow diagram of one embodiment of a method 900 for determining the coverage of an event under an insurance policy based, at least in part, on characteristics of a software program. At step 910, the method 900 is started and is initialized, as described above. Steps 920 and 930 may include accessing characteristics of a software program and determining a property of an insurance policy, as described above.

Step 940 may include determining the characteristics of the software program at the time of a particular event (e.g., an accident or collision). The characteristics may include, inter alia, the operating state of the software program at the time of the event. The operating state may describe the version, features, and/or settings of the software program and/or the like at the time of the event. The characteristics of step 940 may be received via a network (e.g., via a communications module), received from a network-accessible storage device, read from a vehicle storage module, or the like. The characteristics may be received and/or requested when coverage of the event is being evaluated, when the event is detected, and/or the like. Step 940 may include verifying the characteristics, as described above.

Step 950 may include determining a property of the insurance property based, at least in part, upon the characteristics received in step 940. Step 950 may include determining coverage of the event under the insurance policy, such as a coverage amount, deductible, and/or the like.

Coverage may be determined by comparing the received characteristics with recommended values for the characteristics and/or the insurer may include rules for determining coverage from received characteristics. At step 960, the method 900 ends until a next event occurs and/or updated characteristics are received.

Figure 10:
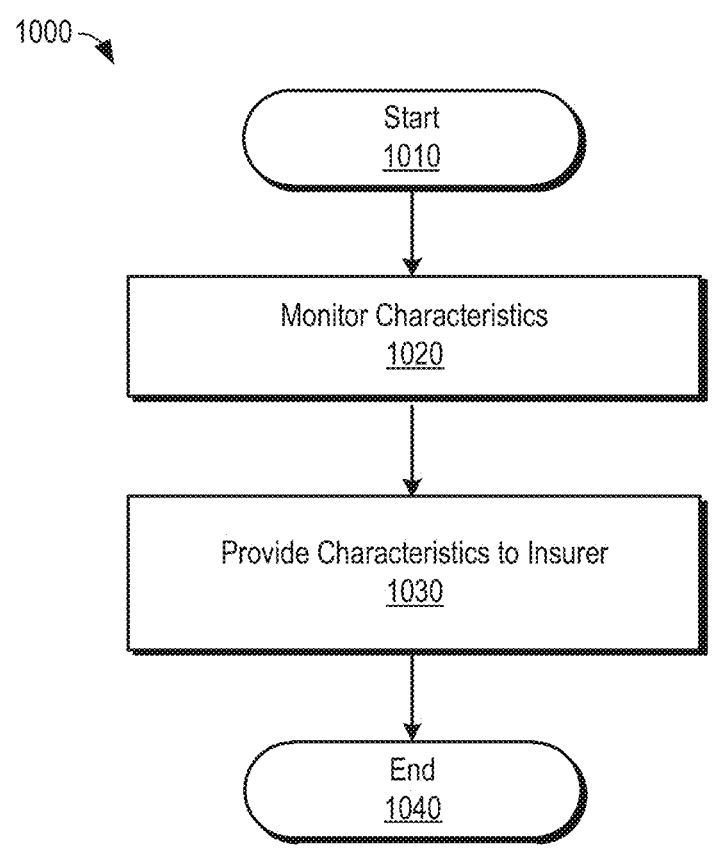
FIG. 10 is a flow diagram of an embodiment of a method of providing a characteristic of a software program to an insurer.

FIG. 10 is a flow diagram of an embodiment of a method 1000 of providing a characteristic of a software program to an insurer. At step 1010, the method 1000 may start and be initialized.

Step 1020 may include monitoring characteristics of a software program. The characteristics may be monitored by a dedicated monitoring module or other entity (e.g., a processing module, storage module, or the like). The characteristics may be embodied in a data structure. The monitoring of step 1020 may be periodic, aperiodic, continuous, real-time, or the like. In some embodiments, the monitoring of step 1020 occurs in response to a user request (e.g., a command from an insurer or from an operator and/or owner of the vehicle). In some embodiments, the monitoring of step 1020 occurs in response to servicing the vehicle, reconfiguring the vehicle, servicing the software program, updating the software program, reconfiguring the software program, enabling the software program, disabling the software program, or the like. Alternatively, or in addition, the monitoring of step 1020 may occur continuously (in real-time) while the vehicle is in operation and/or always.

Step 1030 may include providing the characteristic to an insurer (and/or agent thereof), such as an insurance policy module. Providing the characteristic at step 1030 may include storing the characteristic on a persistent, machine-readable storage medium of the vehicle (e.g., a storage medium), transmitting the characteristic to a network-accessible storage service via a network, transmitting the characteristic to the insurance policy module via the network, or the like. Step 1030 may further include signing the characteristic, encrypting the characteristic, or the like. In some embodiments, step 1030 may include providing an authentication credential with the characteristic, such as a signature and public key certificate, passcode, or the like. Alternatively, or in addition, step 1030 may include transmitting the characteristic using a secure communication mechanism, such as SSL and/or mutually authenticated SSL. The method ends at step 1040.

In response to receiving the characteristic, the insurer may determine a property of an insurance policy, adjust a property of the insurance policy, determine a property of the insurance policy (e.g., coverage of the insurance policy) for a particular event, and/or provide a notice, a warning, an instruction and/or advice to an operator, or the like, as described above.

Figure 11:
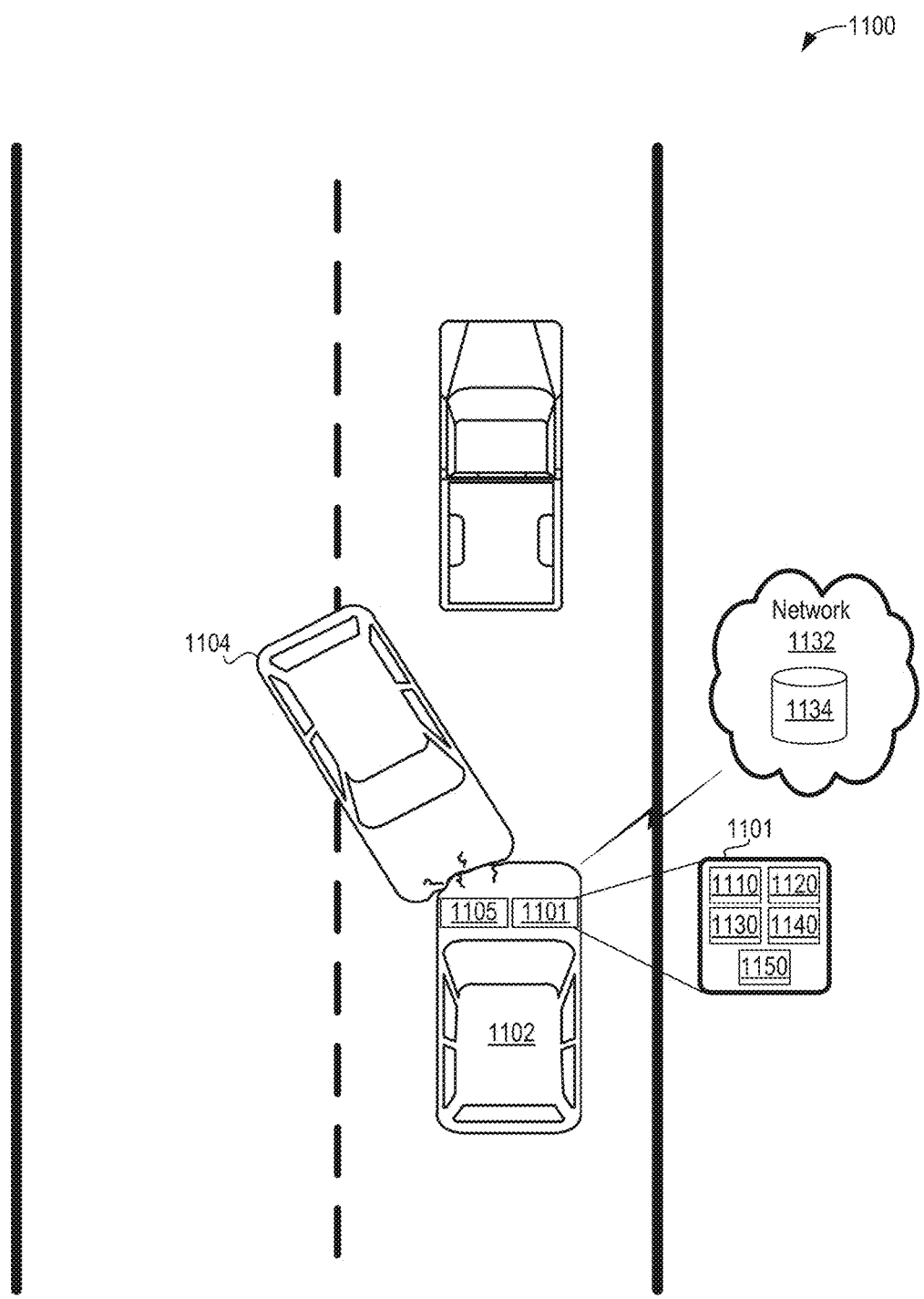
FIG. 11 is a block diagram depicting one embodiment of an exemplary computer system operating on a ground vehicle.

FIG. 11 is a block diagram 1100 depicting one embodiment of an exemplary computer system 1101 operating on a ground vehicle 1102, such as a car, truck, bus, train, or any other type of vehicle. The computer system 1101 may include a software program 1110, such as a collision avoidance software program, configured to operate on a processor 1120. The software program 1110 may be communicatively coupled to a vehicle control system 1105 and may operate and/or interact with the vehicle control system 1105. After a collision, such as the illustrated collision between the vehicle 1102 and another vehicle 1104, the computer system 1101 may be configured to save pre-collision status data from the software program 1110. The pre-collision status data may indicate an internal state of the software program 1110 before, during, and/or after a collision has occurred.

The computer system 1101 may include a collision detection module 1140. The collision detection module 1140 may continuously monitor the vehicle 1102 to determine if a collision has occurred. The collision detection module 1140 may leverage collision detection sensors used by other systems (e.g., an airbag deployment system) and/or may detect collisions based on measurements by an acceleration sensor, an impact sensor, an electromagnetic radiation and/or ultrasonic proximity sensor, and/or the like. Once a collision has been detected, the collision detection module 1140 may signal to a storage module 1150 that a collision has occurred.

The storage module 1150 may be configured to save pre-collision status data from the software program 1110 to a persistent, computer-readable storage medium. The persistent, computer-readable storage medium may be located onboard the vehicle 1102 and may be configured to withstand damage from the collision without loss of saved data. In an embodiment, the storage module 1150 may continuously monitor and save all pre-collision status data. Alternatively, the pre-collision status data may be saved by the storage module 1150 for a predetermined time period and discarded if a collision has not been detected. For example, a history window may store data for the predetermined time period, and the history window may be saved when the collision is detected and/or a predetermined amount of time after the collision is detected. Accordingly, the pre-collision status data may include status data collected for a predetermined amount of time after the collision.

Instead of, or in addition to, saving the pre-collision status data, a communications module 1130 may transmit the pre-collision status data to an insurer, a network-accessible storage device 1134, and/or the like using an infrastructure network 1132 (e.g., the Internet). The pre-collision status data may be encrypted and/or cryptographically signed prior to storage by the storage module 1150 and/or network-accessible storage device 1134 and/or prior to transmission. The pre-collision status data may be reviewed at a later time to determine fault of an operator, the software program, and/or the like. The pre-collision status data may allow problems with the software program to be revised and/or fixed. The insurer may determine coverage of the collision from the pre-collision status data, and/or the insurer may use the pre-collision status data to determine what insurance policy properties and/or adjustments to insurance policy properties should be applied to vehicle operators with similar software programs (e.g., how the premiums, deductibles, etc., should be adjusted for vehicle operators based on their use of a software program with similar characteristics).

Figure 12:
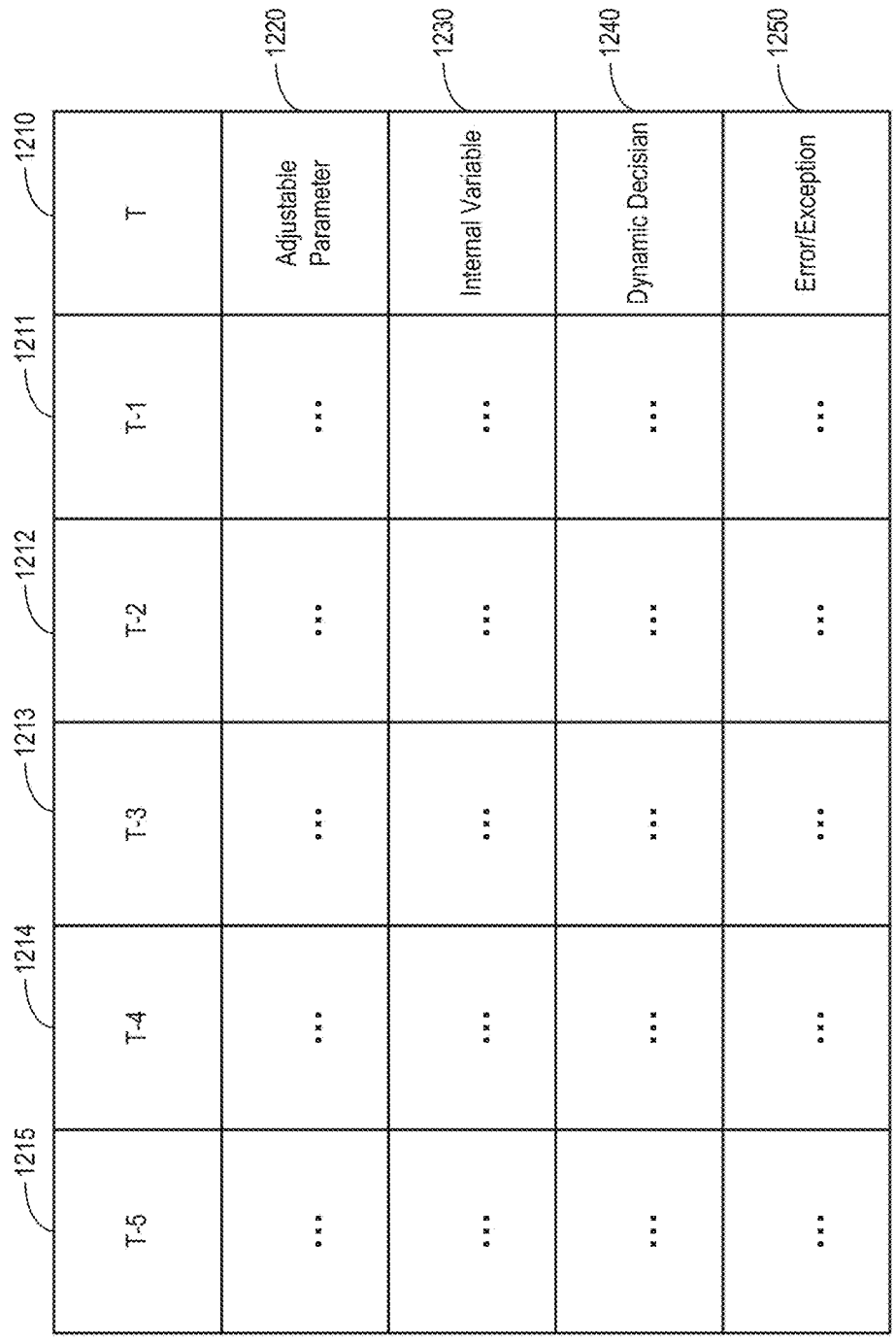
FIG. 12 depicts one embodiment of a history window for storing status data from a software program for a predetermined time period.

FIG. 12 depicts one embodiment of a history window 1200 for storing status data from a software program for a predetermined time period. Pre-collision status data may be sampled at regular intervals and saved to the history window 1200. The history window may store any type of pre-collision status data and/or any number of data elements. The pre-collision status data may include, inter alia, adjustable parameters 1220, internal variables 1230, dynamic decisions 1240, and/or errors/exceptions 1250 from the software program. The most recently sampled status data may be stored in most recent status data slot 1210 of the history window 1200. Each time a new sample is taken, the status data in each status data slot 1210-1215 may be shifted to an older data slot. For example, status data in a T-1 data slot 1211 may be moved to a T-2 data slot 1212, status data in a T data slot 1210 may be moved to the T-1 data slot 1211, and currently sampled status data may be stored in the T data slot 1210. Data in a last data slot 1215 may be overwritten, deleted, and/or the like. Although the depicted history window 1200 has six data slots, various embodiments may include history windows of any size. The history window 1200 may be a data structure in a computer-readable storage medium, and each status data slot may correspond to one or more virtual and/or physical address blocks in the storage medium.

Figure 13:
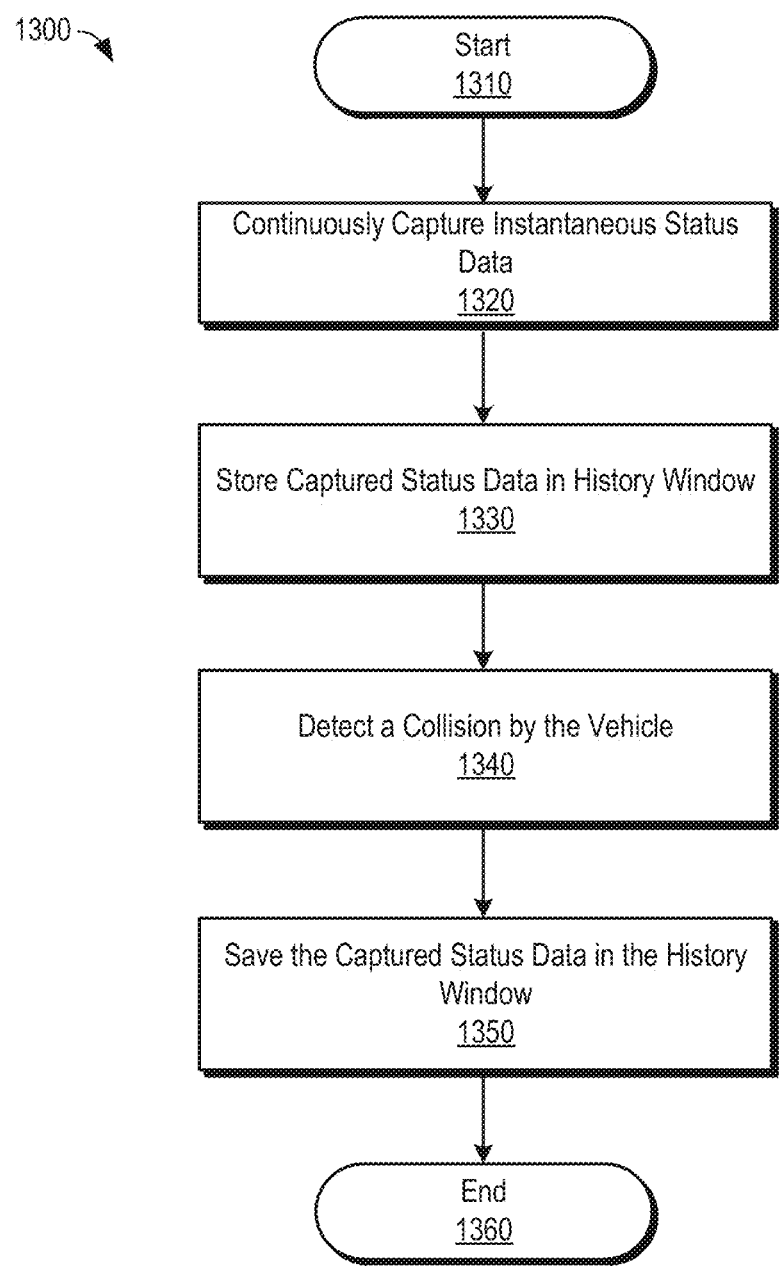
FIG. 13 is a flow diagram of a method of saving pre-collision status data for a vehicle experiencing a collision.

FIG. 13 is a flow diagram of a method 1300 of saving pre-collision status data for a vehicle experiencing a collision. At step 1310, the method 1300 begins. The method 1300 may begin in response to the vehicle being started, a request from a user or insurer, and/or the like. Step 1310 may include accessing one or more machine-readable instructions in a non-volatile storage media, such as a hard disk, solid-state storage device, or the like. Step 1310 may further include accessing one or more machine components, such as network interfaces, data storage resources (e.g., database connections), and so on.

Step 1320 may include continuously capturing instantaneous status data from a software program operating on the vehicle. In an embodiment, the instantaneous status data may be requested from the software program through a method or function call. Alternatively, the instantaneous status data may be determined by directly accessing one or more memory locations of a computer readable medium. At step 1330, the captured status data may be stored in a history window (e.g., the history window 1200). Storing the captured status data in the history window may include deleting or overwriting an oldest data slot, shifting one or more data slots, storing the captured status data in a vacated data slot and/or data slot that can be overwritten, and/or the like. The history window may be continuously updated with captured instantaneous status data, and status data older than a predetermined time period may be discarded. Thus, the history window may at any moment contain status data for a predetermined time period before that moment.

Step 1340 may include detecting a collision by the vehicle. One or more sensors may be configured to detect when the vehicle has collided with an object and/or another vehicle. The sensors may transmit an indication that a collision occurred to a computer system, and/or the computer system may determine that a collision occurred based on sensor data from the sensors. After the collision is detected, the method 1300 may proceed to step 1350. Step 1350 may include saving the captured status data in the history window to a persistent, computer-readable storage medium. The captured status data may be saved immediately upon detecting the collision and/or the status data may continue to be collected for a predetermined time/number of sampling intervals after the collision. Step 1350 may include ceasing updating of the history window so the history window can be saved without the status data in the history window changing during the saving process. In some embodiments, the history window stored in step 1330 may be stored to the persistent, computer-readable storage medium, and saving the history window in step 1350 may include ceasing updating of the history window without moving and/or copying the history window. The persistent, computer-readable storage medium and/or the computer system modules and/or components may be configured to resist damage from the collision and/or to be able to save the history window despite collision damage. At step 1360, the method 1300 may end.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
providing, via a communication interface, an alert to a driver of a vehicle indicating how modification of a characteristic of a software program operating on a computer system of the vehicle will affect a property of an insurance policy;
receiving, via the communication interface, historical information pertaining to modification by the driver of the characteristic; and
determining, using a processor, an adjustment to the property of the insurance policy based, at least in part, on the historical information and how consistently the driver makes modifications in response to alerts.

2. The method of claim 1, wherein the characteristic comprises a version of the software program, and wherein the modification comprises an updated version of the software program.

3. The method of claim 1, wherein the characteristic is a parameter of the software program selected from the group consisting of a collision avoidance parameter, a collision mitigation parameter, and a pre-collision warning parameter.

4. The method of claim 1, wherein the characteristic comprises an operational state of the software program.

5. The method of claim 1, wherein the historical information comprises a ratio of operation time during which the software program is in a first state verses operation time which the software program is in a second state.

6. The method of claim 5, wherein the first state corresponds to a pre-modification state and the second state corresponds to a post-modification state.

7. The method of claim 1, wherein the alert comprises information on how the driver may make the modification to the software program.

8. The method of claim 1, wherein providing an alert comprises providing real-time advice associated with an effect on the property of the insurance policy based on whether the driver modifies the characteristic of the software program.

9. The method of claim 1, wherein the alert is sent to a portable communication device of the driver of the vehicle.

10. The method of claim 1, wherein the alert comprises a visual alert.

11. The method of claim 1, wherein the alert is displayed on a heads-up display of the vehicle.

12. A system comprising:
a communications module that provides to a driver of a vehicle an alert indicating how modification of a characteristic of a software program operating on a computer system of the vehicle will affect a property of an insurance policy, wherein the communications module sends historical information pertaining to modification by the driver of the characteristic; and
an insurance module operating on a processor of the computing device, wherein the insurance module determines an adjustment to the property of the insurance policy based, at least in part, on the historical information and how consistently the driver makes modifications in response to alerts.

13. The system of claim 12, wherein the characteristic comprises a setting of the software program.

14. The system of claim 12, wherein the characteristic comprises a type of the software program.

15. The system of claim 12, wherein the characteristic comprises a feature of the software program.

16. The system of claim 15, wherein the characteristic comprises an indication that the feature of the software program has been disabled.

17. The system of claim 12, wherein the characteristic comprises a version of the software program.

18. The system of claim 17, wherein the communications module is configured to receive a version number for the version of the software program.

19. The system of claim 17, wherein the alert comprises an indication that the software program should be upgraded.

20. The system of claim 19, wherein the communications module is configured to transmit an indication of differences in the property of the insurance policy for different versions of the software program.

21. The system of claim 12, wherein the characteristic comprises an identification of the software program.

22. The system of claim 12, wherein the characteristic comprises a version of the software program, and wherein the modification comprises an updated version of the software program.

23. The system of claim 12, wherein the characteristic is a parameter of the software program selected from the group consisting of a collision avoidance parameter, a collision mitigation parameter, and a pre-collision warning parameter.

24. The system of claim 12, wherein the characteristic comprises an operational state of the software program.

25. The system of claim 12, wherein the historical information comprises a ratio of operation time during which the software program is in a first state verses operation time which the software program is in a second state.

26. The system of claim 25, wherein the first state corresponds to a pre-modification state and the second state corresponds to a post-modification state.

27. The system of claim 12, wherein the alert comprises information on how the driver may make the modification to the software program.

28. The system of claim 12, wherein the alert is sent to a portable communication device of the driver of the vehicle.

29. The system of claim 12, wherein the alert comprises a visual alert.

30. The system of claim 12, wherein the alert is displayed on a heads-up display of the vehicle.

* * * * *